United States Patent
Sawa et al.

(10) Patent No.: US 10,343,501 B2
(45) Date of Patent: Jul. 9, 2019

(54) DOOR IMPACT BEAM

(71) Applicant: NIPPON STEEL & SUMITOMO METAL CORPORATION, Tokyo (JP)

(72) Inventors: Yasunori Sawa, Tokyo (JP); Yoshiaki Nakazawa, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 15/322,349

(22) PCT Filed: Jun. 30, 2014

(86) PCT No.: PCT/JP2014/067353
§ 371 (c)(1),
(2) Date: Dec. 27, 2016

(87) PCT Pub. No.: WO2016/001966
PCT Pub. Date: Jan. 7, 2016

(65) Prior Publication Data
US 2017/0129314 A1     May 11, 2017

(51) Int. Cl.
*B60J 5/04* (2006.01)
*B60R 21/02* (2006.01)
*B60R 21/00* (2006.01)

(52) U.S. Cl.
CPC .......... *B60J 5/0443* (2013.01); *B60J 5/0437* (2013.01); *B60J 5/0444* (2013.01); *B60J 5/0483* (2013.01);
(Continued)

(58) Field of Classification Search
CPC ...... B60J 5/0437; B60J 5/0443; B60J 5/0483; B60J 5/0444; B60R 2021/0006; B60R 21/02
(Continued)

(56) References Cited

U.S. PATENT DOCUMENTS 3,868,141 A * 2/1975 Johnson ................ B60J 5/0437
                                                    188/268
3,995,081 A * 11/1976 Fant ...................... B29C 70/865
                                                    244/123.3
(Continued)

FOREIGN PATENT DOCUMENTS

CN    201021235 Y    2/2008
JP    10-166860 A    6/1998
(Continued)

OTHER PUBLICATIONS

English translation of the Preliminary Report on Patentability and Written Opinion of the International Searching Authority (PCT/ISA/237, PCT/IB/338 and PCT/IB/373) issued in PCT/JP2014/067353, dated Jan. 12, 2017.
(Continued)

*Primary Examiner* — Patrick J Maestri
*Assistant Examiner* — Joseph J. Sadlon
(74) *Attorney, Agent, or Firm* — Birch, Stewart, Kolasch & Birch, LLP

(57) ABSTRACT

A main body (2) has door attaching portions respectively formed on both end sides of a long longitudinal direction thereof and a bending deformation generation portion (3) disposed between the door attaching portions, and the bending deformation generation portion (3) has a groove bottom portion (4), two edge line portions (5a, 5b), two vertical wall portions (6a, 6b), two curved portions (7a, 7b), and two flanges (8a, 8b). There is provided a bead (13) which is formed toward the longitudinal direction of the main body (2) in a part of the groove bottom portion (4) in a manner to project in a shape having a curved surface toward the outside of a cross-sectional shape of the bending deformation generation portion (3) so as to oppose an impact load acting on a door impact beam (1).

4 Claims, 27 Drawing Sheets

(52) U.S. Cl.
CPC ...... *B60R 21/02* (2013.01); *B60R 2021/0006* (2013.01); *B60Y 2410/121* (2013.01); *B60Y 2410/124* (2013.01)

(58) Field of Classification Search
USPC ........ 428/174; 52/850; 180/89.1; 244/117 A, 244/117 R, 118.1–137.4; 296/187.01–209, 29, 30
See application file for complete search history.

(56) References Cited

U.S. PATENT DOCUMENTS

| | | | | |
|---|---|---|---|---|
| 4,290,641 A * | 9/1981 | Miyauchi | ............... | B60J 5/0447 296/146.6 |
| 4,306,381 A * | 12/1981 | Presto | ................... | B60J 5/0405 296/146.2 |
| 4,397,914 A * | 8/1983 | Miura | ................ | B29C 44/1271 296/187.02 |
| 4,411,466 A * | 10/1983 | Koike | ................... | B60J 5/0411 296/146.6 |
| 4,599,843 A * | 7/1986 | Ingvarsson | ........... | B60J 5/0444 296/146.6 |
| 4,684,166 A * | 8/1987 | Kanodia | ................ | B60J 5/0447 296/146.6 |
| 4,998,761 A * | 3/1991 | Bayer | .................... | B60R 19/18 293/121 |
| 5,124,186 A * | 6/1992 | Wycech | ................ | B60J 5/0444 264/46.6 |
| 5,385,375 A | 1/1995 | Morgan et al. | | |
| 5,404,690 A * | 4/1995 | Hanf | ...................... | B60J 5/0437 29/897.2 |
| 5,480,189 A * | 1/1996 | Davies | .................. | B62D 21/02 280/784 |
| 5,545,361 A * | 8/1996 | Rosasco | ................ | B29C 44/188 264/278 |
| 5,580,120 A * | 12/1996 | Nees | ...................... | B60J 5/0444 296/146.6 |
| 5,623,246 A * | 4/1997 | Kruse | .................. | B60R 21/0132 180/274 |
| 5,785,376 A * | 7/1998 | Nees | ...................... | B60J 5/0444 296/146.6 |
| 5,868,456 A * | 2/1999 | Kowalski | ............... | B60J 5/0444 296/146.6 |
| 5,992,922 A * | 11/1999 | Harbig | .................. | B60J 5/0444 296/146.6 |
| 6,020,039 A * | 2/2000 | Cline | ...................... | B60J 5/0444 296/146.6 |
| 6,082,811 A * | 7/2000 | Yoshida | ................ | B21C 23/205 296/146.6 |
| 6,096,403 A * | 8/2000 | Wycech | ............. | B29C 44/1228 428/122 |
| 6,189,953 B1 * | 2/2001 | Wycech | .................. | B62D 29/002 296/187.02 |
| 6,325,431 B1 * | 12/2001 | Ito | .......................... | B60R 19/18 293/102 |
| 6,406,078 B1 * | 6/2002 | Wycech | ............. | B29C 44/1228 293/120 |
| 6,416,114 B1 * | 7/2002 | Topker | ................... | B60J 5/0443 296/146.6 |
| 6,474,726 B1 * | 11/2002 | Hanakawa | ........... | B62D 29/002 296/187.12 |
| 6,546,693 B2 * | 4/2003 | Wycech | .................... | B32B 5/20 52/790.1 |
| 6,746,061 B1 * | 6/2004 | Evans | ..................... | B60R 19/18 293/120 |
| 6,793,743 B2 * | 9/2004 | McNulty | ................ | B60J 5/0437 148/320 |
| 6,887,349 B2 * | 5/2005 | Ruthven | ........... | A61F 13/15731 162/109 |
| 7,316,432 B2 * | 1/2008 | Muskos | .................. | B60R 19/18 293/102 |
| 7,347,486 B2 * | 3/2008 | Uchida | ................. | B21C 37/155 296/187.03 |
| 7,631,925 B2 * | 12/2009 | Tanaka | ....................... | B60J 1/17 296/146.2 |
| 7,699,367 B2 * | 4/2010 | Evans | ...................... | B60R 19/18 293/102 |
| 7,874,600 B2 * | 1/2011 | Hashimura | ............. | B60R 19/18 293/102 |
| 8,011,717 B2 * | 9/2011 | Endo | ......................... | B60J 5/0451 296/146.7 |
| 8,061,763 B2 * | 11/2011 | Melz | ...................... | B60J 5/0459 296/146.6 |
| 8,465,087 B2 * | 6/2013 | Gerwolls | .................. | F16F 7/12 188/377 |
| 8,714,631 B2 * | 5/2014 | Takahashi | .............. | B21D 47/00 296/187.04 |
| 8,870,261 B2 * | 10/2014 | Ito | .......................... | B60J 5/0429 296/146.6 |
| 8,910,999 B2 * | 12/2014 | Schurter | ................. | B60J 5/0415 296/146.2 |
| 9,180,760 B2 * | 11/2015 | Schleichert | ............ | B23K 11/26 |
| 9,199,670 B2 * | 12/2015 | Otsuka | .................. | B62D 21/157 |
| 2005/0269823 A1 * | 12/2005 | DeVoursney | ........... | B60R 19/18 293/102 |

FOREIGN PATENT DOCUMENTS

| | | | |
|---|---|---|---|
| JP | 10166860 A | * | 6/1998 |
| JP | 2005-001615 A | | 1/2005 |
| JP | 2005-319915 A | | 11/2005 |
| JP | 2008-284934 A | | 11/2008 |
| JP | 2009-196488 A | | 9/2009 |
| JP | 2009-196506 A | | 9/2009 |
| JP | 2013-212793 A | | 10/2013 |
| JP | 2014-050915 A | | 3/2014 |

OTHER PUBLICATIONS

International Search Report (PCT/ISA/210) issued in PCT/JP2014/067353, dated Sep. 22, 2014.
Written Opinion (PCT/ISA/237) issued in PCT/JP2014/067353, dated Sep. 22, 2014.
Exended European Search Report dated Feb. 16, 2018 in corresponding Patent Application No. 14896944.7.

* cited by examiner

F I G. 1
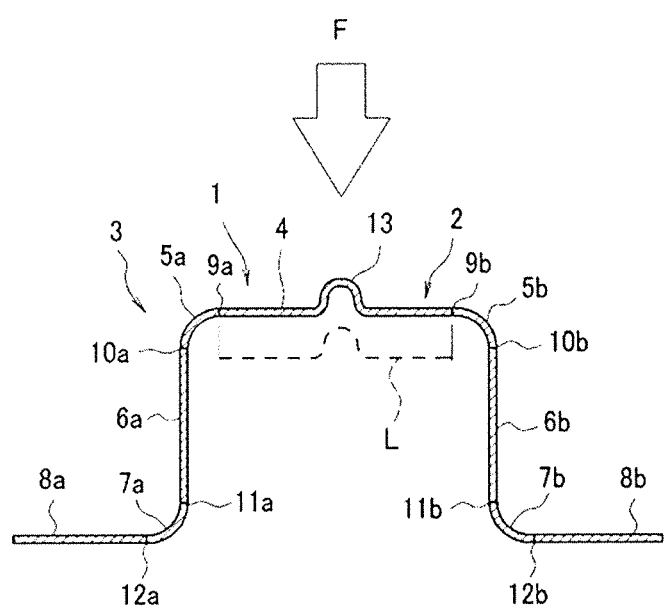

WITHOUT PROJECTING BEAD

ST=0mm

ST=24mm

CROSS-SECTION COLLISION

ST=45mm

ST=60mm

FIG. 4E
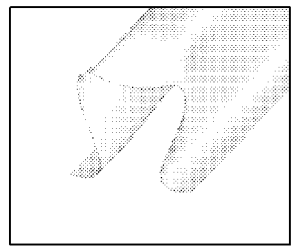
ST=78mm
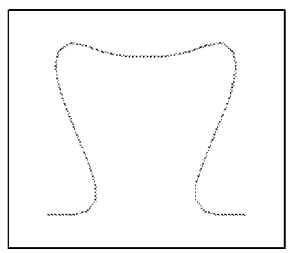
FIG. 4F
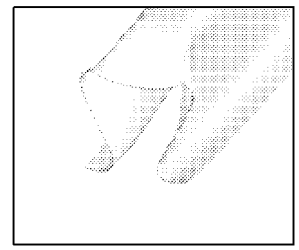
ST=99mm
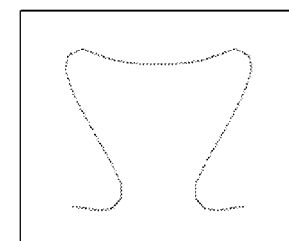
FIG. 4G
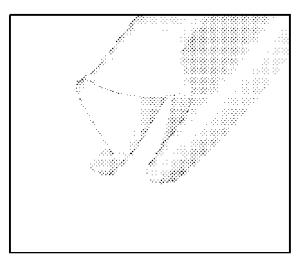
ST=120mm
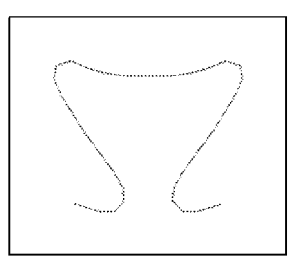

ST=0mm

ST=24mm

ST=45mm

ST=60mm

FIG. 6E
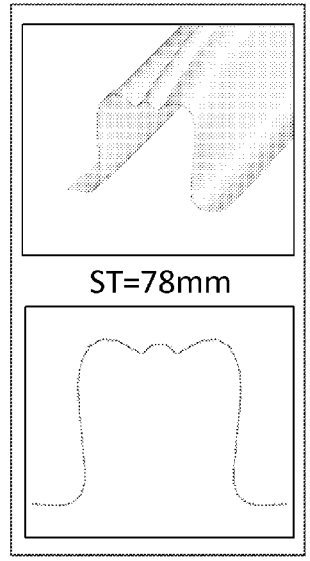
FIG. 6F
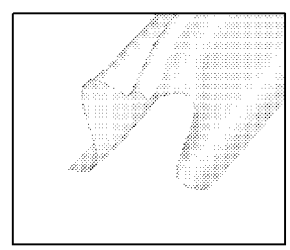
FIG. 6G
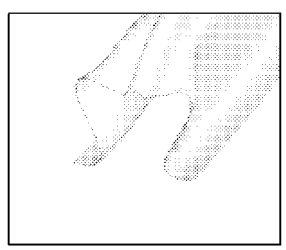
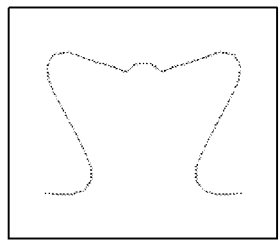

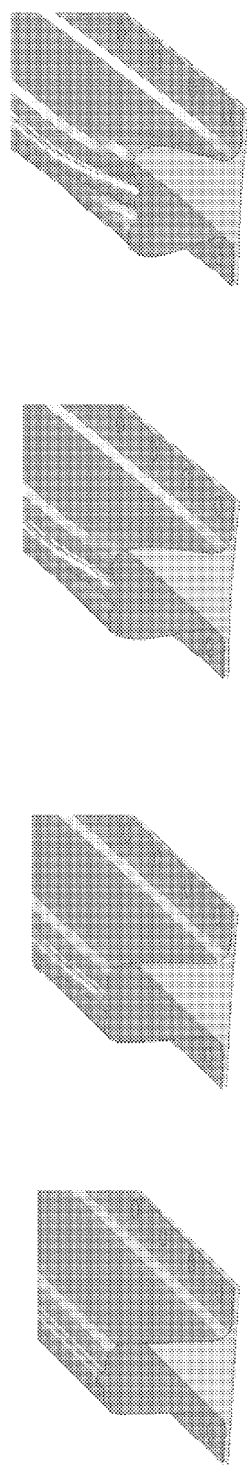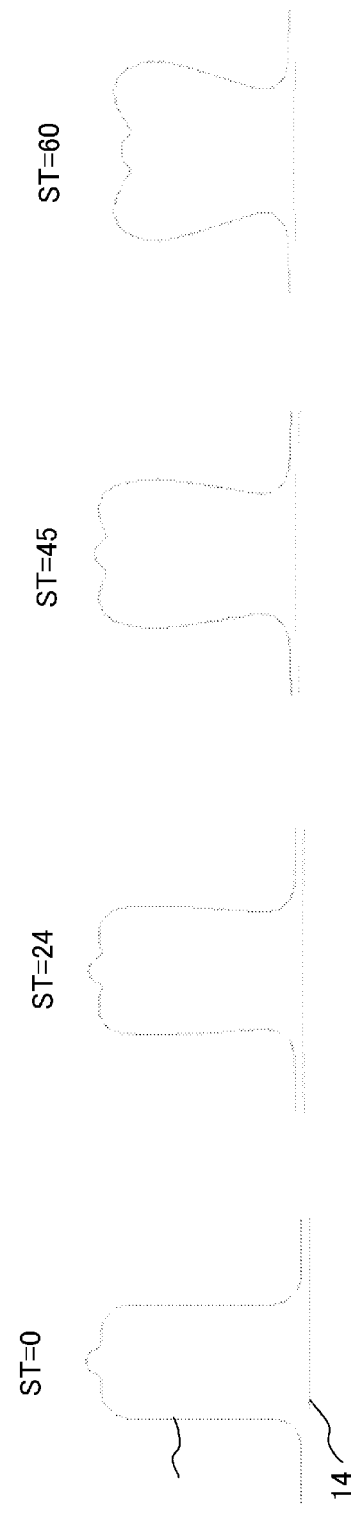
F I G. 17A  ST=0
F I G. 17B  ST=24
F I G. 17C  ST=45
F I G. 17D  ST=60

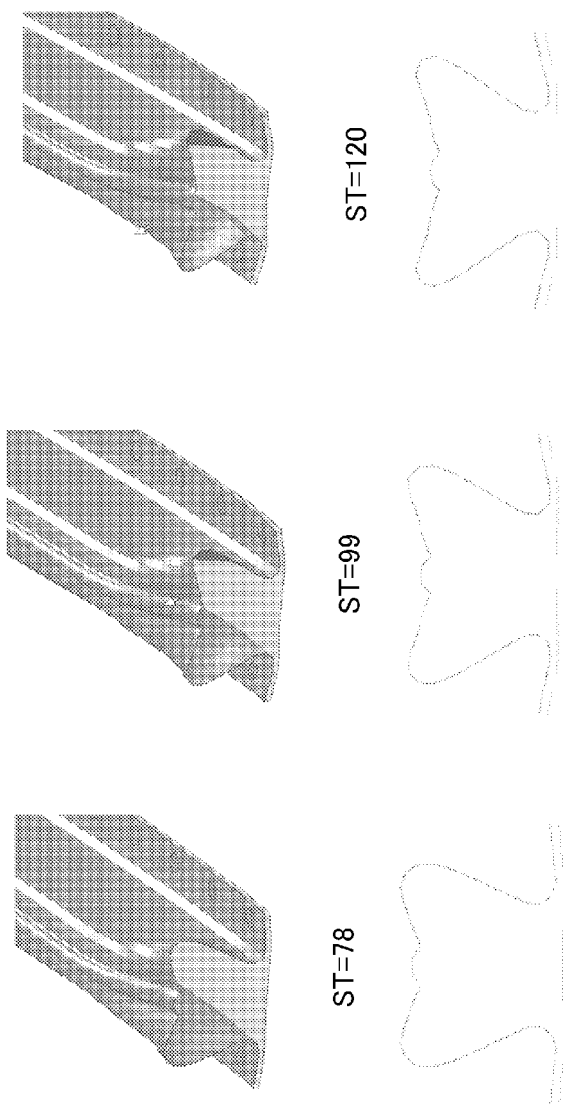

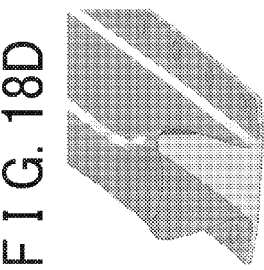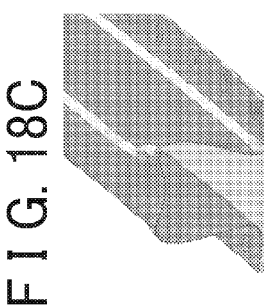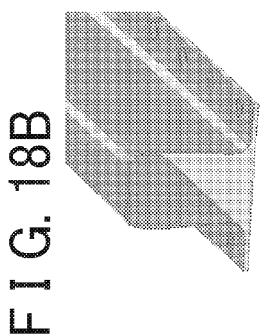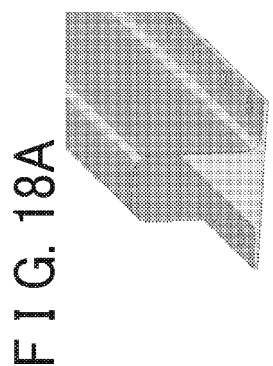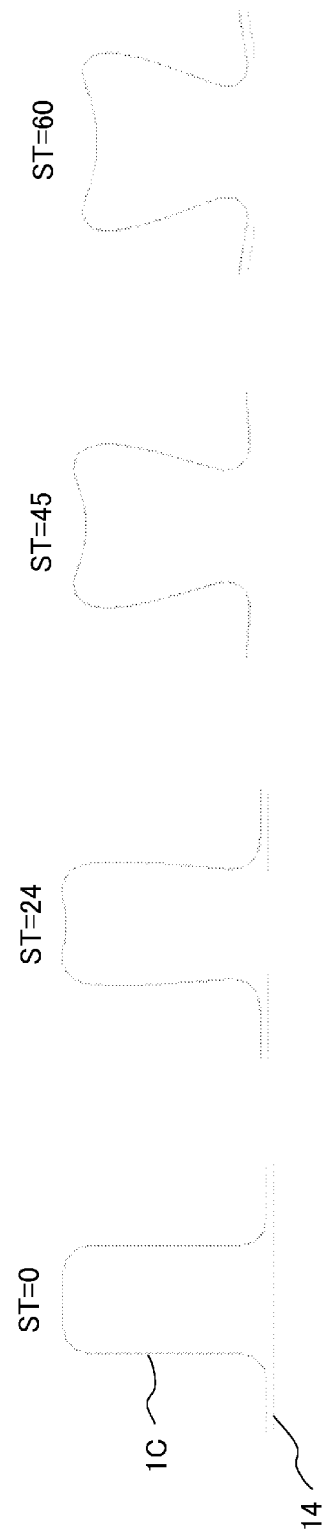

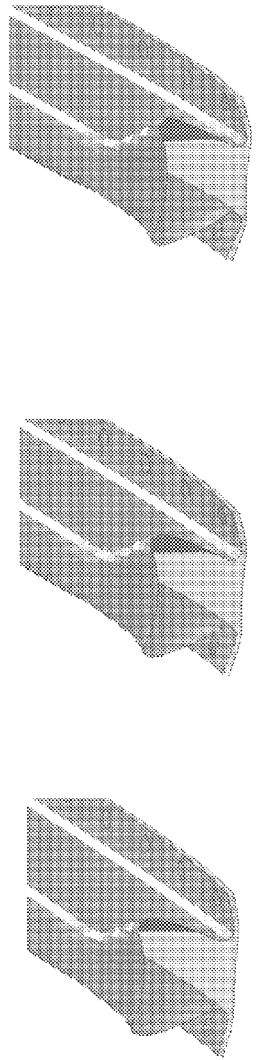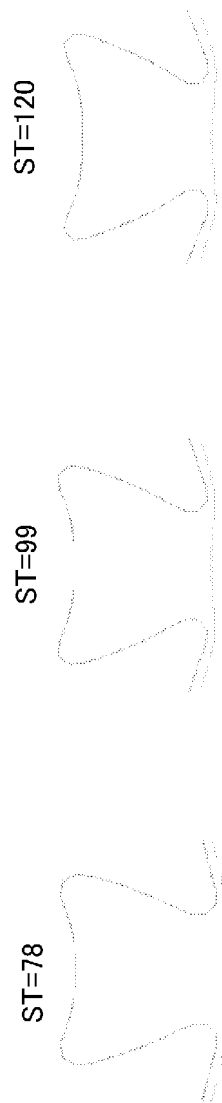

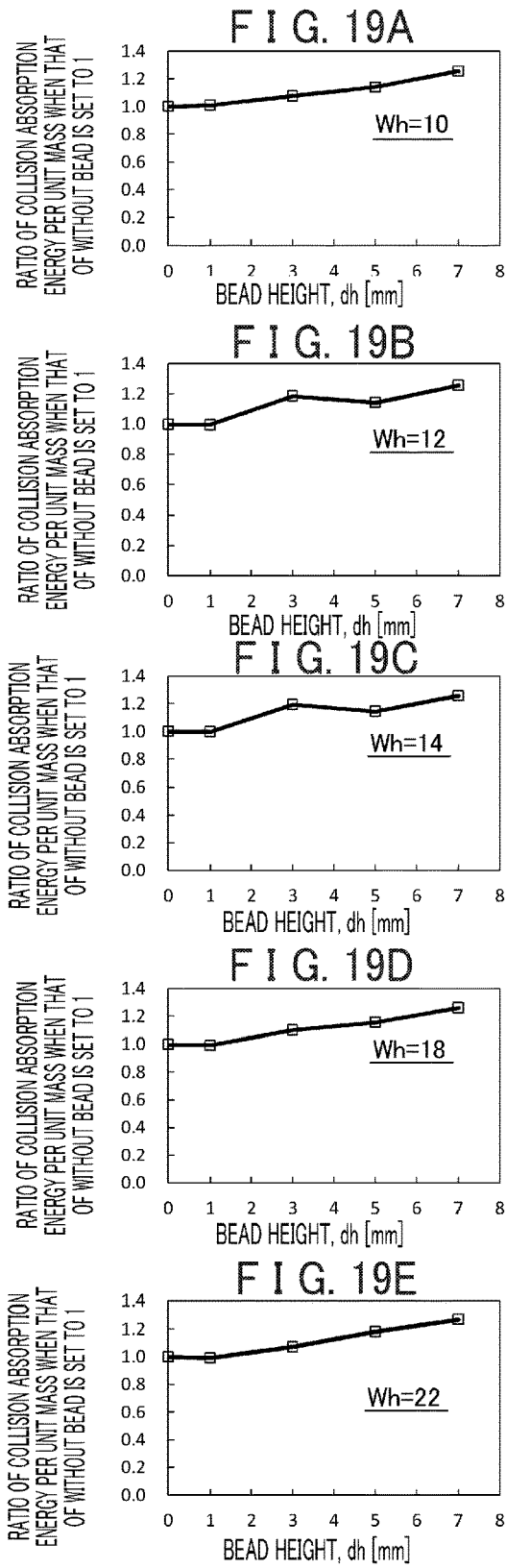

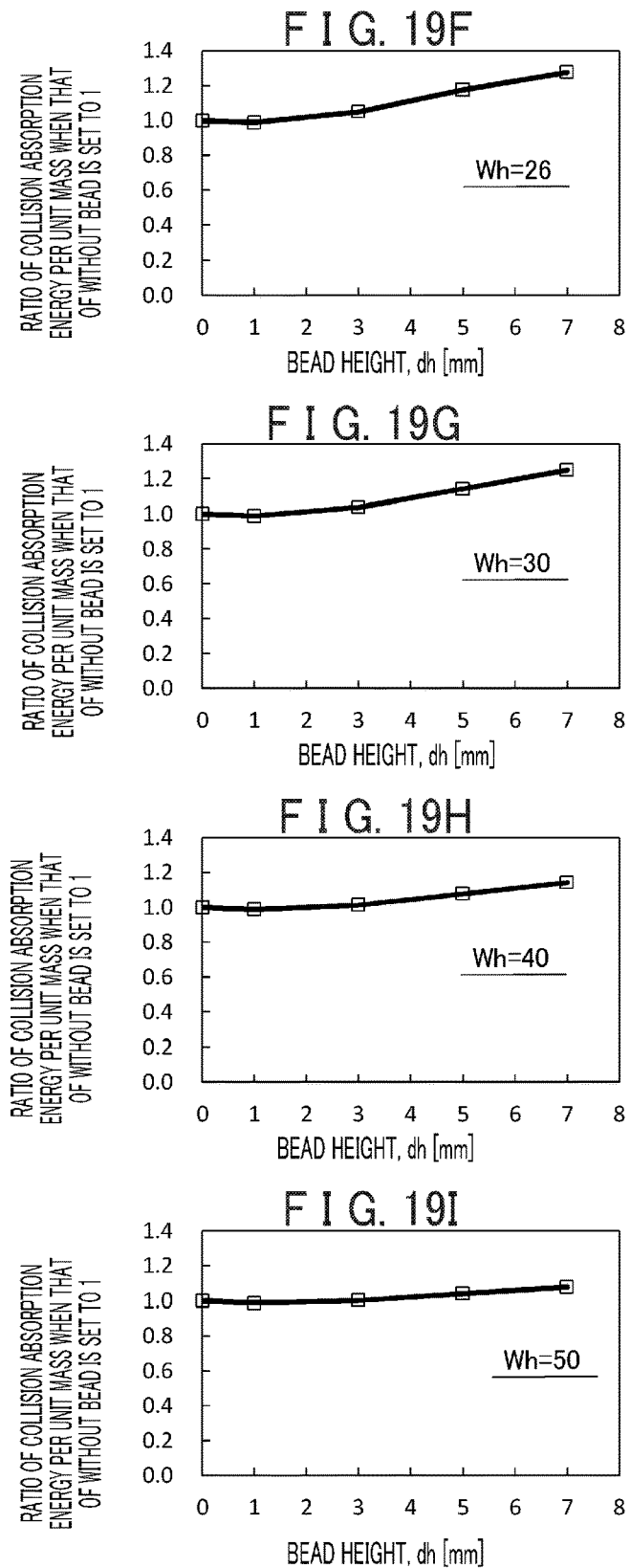

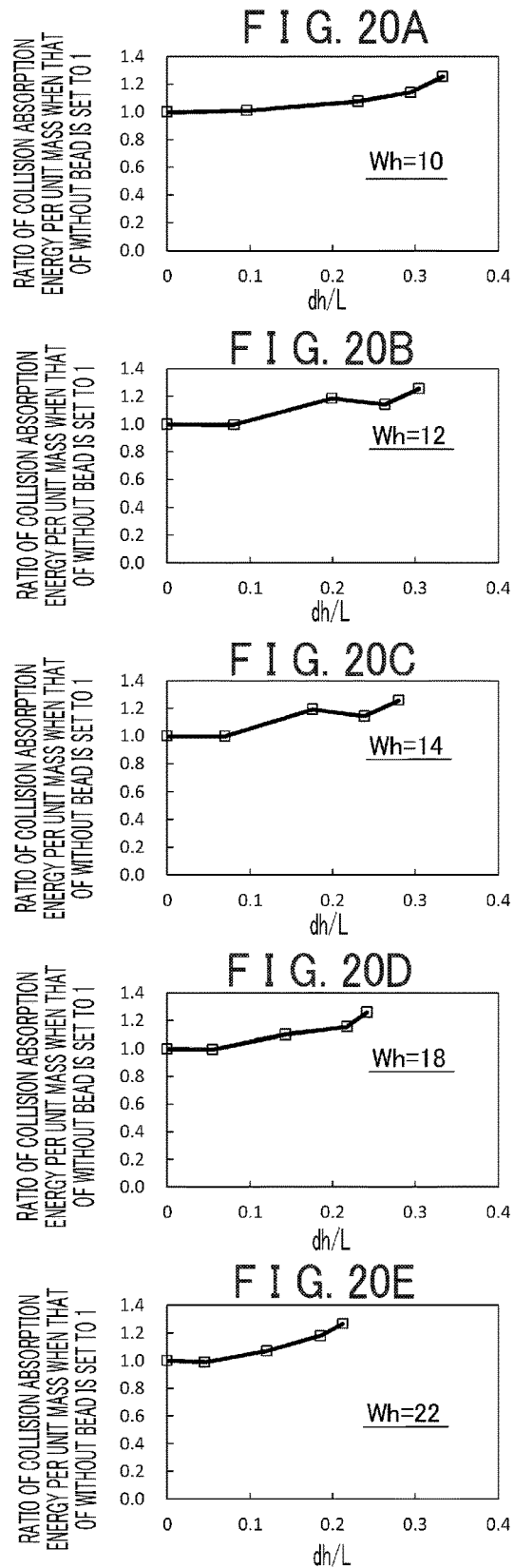

DOOR IMPACT BEAM

TECHNICAL FIELD

The present invention relates to a door impact beam disposed inside a door of an automobile.

BACKGROUND ART

A door of an automobile is constituted by assembling an outer panel which creates an appearance and an inner panel which is a frame of the door and chiefly maintains a strength by, for example, hemming (180° bending). Door component parts such as a door lock mechanism, a door glass, and a window regulator are housed between the outer panel and the inner panel.

A recent automobile often has, between an outer panel and an inner panel, a door impact beam being a long reinforcing member which is disposed in a manner that both ends thereof are fixed in a front and rear direction of the automobile, for the purpose of improving safety at the time of side collision. The door impact beams are divided largely into a closed cross-section type whose material is, for example, a round pipe or the like, and an open cross-section type which has, for example, a groove-shaped transverse cross-section, and each type of the door impact beams absorbs impact energy by three-point bending deformation occurring at a collision load input position being a point of action when an impact load by side collision is applied.

As described above, since it is necessary that the door impact beam is disposed in a narrow space between the outer panel and the inner panel, avoiding interference with the aforementioned various door component parts, the door impact beam is required to absorb collision energy efficiently with a small cross-section. Various suggestions have been proposed regarding such door impact beams.

Patent Literature 1 discloses invention of a door impact beam made of a thin steel sheet with a hat-shaped open cross-sectional shape which has: a groove bottom portion; two edge line portions continuing to the groove bottom portion; two vertical wall portions continuing to the two edge line portions respectively; two curved portions continuing to the two vertical wall portions respectively; and two flanges continuing to the two curved portions respectively, wherein a reinforcing plate is disposed in a part of one of the vertical walls—one of the edge line portion—the groove bottom portion—the other edge line portion—a part of the other vertical wall, to thereby partially reinforce a range between a plane of the groove bottom portion and the edge line portions, so that cross-section collapse of the hat-shaped open cross-sectional shape is suppressed at the time of collision, whereby an absorption performance of collision energy is improved.

Patent Literature 2 discloses invention of a door impact beam made of a thin steel sheet with a practically U-shaped open cross-sectional shape, wherein formation of a bead projecting toward the inside at a top portion of a U-shape reduces a possibility of fracture while increasing an absorption performance of impact energy.

Incidentally, Patent Literature 3, which relates to a center pillar of an automobile, discloses invention of the center pillar which has a bending deformation promoting bead and an auxiliary bead provided in a top portion plane of a reinforcement disposed as a reinforcing member to an outer panel made of a resin.

CITATION LIST

Patent Literature

Patent Literature 1: Japanese Laid-open Patent Publication No. 2009-196488
Patent Literature 2: Japanese Laid-open Patent Publication No. 2008-284934
Patent Literature 3: Japanese Laid-open Patent Publication No. 2005-1615

SUMMARY OF INVENTION

Technical Problem

In the invention disclosed by Patent Literature 1, in the hat-shaped open cross-sectional shape at the time of collision, cross-section collapse occurs since a center portion of the groove bottom portion is discontinued, bringing about load loss due to the cross-section collapse, so that an absorption performance of collision energy is likely to be reduced.

Further, in the invention disclosed by Patent Literature 2, deflection is considered to be suppressed since the bead to be a projection toward the inside is formed at the top portion of the U-shape, to thereby disperse distortion occurring by application of the impact load, but formation of the bead being the projection toward the inside at the top portion of the U-shape brings about a discontinuous shape that the top portion of the U-shape surges. Thereby, the top portion of the U-shape is likely to deflect at the time of application of the impact energy, so that distortion becomes likely to be concentrated in a corner portion (edge line equivalent portion) of the top portion of the U-shape. Therefore, if a door impact beam is constituted by a material with small elongation in particular (for example, a high-tensile steel sheet with a tensile strength of 780 MPa or more), fracture due to application of impact energy may occur, bringing about problems that a desired collision energy absorption performance cannot be obtained, and so on.

Further, in the invention disclosed by Patent Literature 3, the auxiliary bead merely has a load transmission function to the bending deformation promoting bead, and is not directly related to a collision energy absorption performance.

Solution to Problem

The present inventors considered that if deformation due to bending progresses in a door impact beam having a main body with a hat-shaped open cross-sectional shape to which an impact load is applied, loss in collision load occurs due to collapse of a cross-section of the open cross-sectional shape and risk of fracture increases due to localization of deformation, and conducted keen study to obtain a cross-sectional shape having high resistibility against collapse of a cross-section and capable of dispersing deformation, and consequently found out that the above-described problem can be solved as a result that, in a door impact beam having a main body constituted by a molded body made of a thin steel sheet which typically has a hat-shaped cross-sectional shape, a bead of a shape to project having a curved surface toward the outside of a cross-sectional shape is formed toward a longitudinal direction in a part of a groove-bottom portion of the main body, and conducted further study, to thereby complete the present invention.

The present invention is cited below.

(1) A door impact beam constituted to include a long main body being a molded body of a metal plate, the main body having: door attaching portions respectively formed on both end portion sides of a long longitudinal direction thereof;

and a bending deformation generation portion disposed between the door attaching portions, wherein the bending deformation generation portion has: a groove bottom portion; two edge line portions continuing to the groove bottom portion respectively; two vertical wall portions continuing to the two edge line portions respectively; two curved portions continuing to the two vertical wall portions respectively; and two flanges continuing to the two curved portions respectively, the door impact beam having a bead which is formed toward the longitudinal direction of the main body in a part of the groove bottom portion in a manner to project in a shape having a curved surface toward the outside of a cross-sectional shape of the bending deformation generation portion so as to oppose an impact load acting on the door impact beam.

(2) The door impact beam according to (1), wherein the bending deformation generation portion has a hat-shaped open cross-sectional shape whose hat height is 50 mm or less and a cross-sectional peripheral length of the groove bottom portion is 10 mm≤L≤35 mm, and wherein the bead satisfies relationships in a formula (1) and a formula (2) below.

$$1 \text{ mm} < dh \leq 7 \text{ mm} \quad (1)$$

$$0.1 \leq dh/L \quad (2)$$

Here, a reference symbol L in the above formula (1) and the formula (2) indicates a cross-sectional peripheral length of a groove bottom portion and a reference symbol dh indicates a height of the bead from a plane of the groove bottom portion.

(3) The door impact beam according to (1), wherein a back plate is joined to the two flanges.

(4) The door impact beam according to (1), wherein the bending deformation generation portion has a closed cross-sectional shape made by joining a back plate to the two flanges in a hat-shaped cross-section whose hat height is 50 mm or less and a cross-sectional peripheral length of the groove bottom portion is 10 mm≤L≤35 mm, and wherein the bead satisfies relationships in a formula (3) and a formula (4) below.

$$1 \text{ mm} < dh \leq 7 \text{ mm} \quad (3)$$

$$0.1 \leq dh/L \quad (4)$$

Here, a reference symbol L in the formula (3) and the formula (4) above indicates a cross-sectional peripheral length of the groove bottom portion and a reference symbol dh indicates a height of the bead from a plane of the groove bottom portion.

(5) The door impact beam according to any one of (1) to (4), wherein the bead is formed in a region of at least 5% or more of an entire length of the longitudinal direction of the bending deformation generation portion in a vicinity of a central portion thereof.

Advantageous Effects of Invention

The present invention provides a door impact beam constituted by a molded body made by a thin steel sheet having a predetermined cross-sectional shape and capable of absorbing collision energy efficiently by suppressing load loss and fracture caused by collapse of the cross-sectional shape at the time of collision.

BRIEF DESCRIPTION OF DRAWINGS

FIG. 1 shows a cross-sectional view showing a transverse cross-sectional shape of an example of a door impact beam according to a first embodiment of the present invention.

FIG. 4A to FIG. 4G show explanatory views showing analysis results of three-point bending of the door impact beam of FIG. 3, and FIG. 4A to FIG. 4G are a perspective view and a cross-sectional view showing a situation of collapse of a cross-section of 0 mm, 24 mm, 45 mm, 60 mm, 78 mm, 99 mm, and 120 mm, respectively, in stroke of bending deformation.

FIG. 6A to FIG. 6G show explanatory views showing analysis results of three-point bending of the door impact beam of FIG. 5, and FIG. 6A to FIG. 6G are a perspective view and a cross-sectional view showing a situation of collapse of a cross-section of 0 mm, 24 mm, 45 mm, 60 mm, 78 mm, 99 mm, and 120 mm, respectively, in stroke of bending deformation.

FIG. 17A to FIG. 17G show explanatory views showing analysis results of three-point bending in the door impact beam according to the second embodiment of the present invention, and FIG. 17A to FIG. 17G show a perspective view and a cross-sectional view showing a situation of collapse of a cross-section in 0 mm, 24 mm, 45 mm, 60 mm, 78 mm, 99 mm, and 120 mm, respectively, in stroke of bending deformation of a three-point bending test.

FIG. 18A to FIG. 18G show explanatory views showing analysis results of three-point bending in a door impact beam according to a comparative example to the second embodiment of the present invention, and FIG. 18A to FIG. 18G show a perspective view and a cross-sectional view showing a situation of collapse of a cross-section in 0 mm, 24 mm, 45 mm, 60 mm, 78 mm, 99 mm, and 120 mm, respectively, in stroke of bending deformation of a three-point bending test.

FIG. 19A to FIG. 19I show graphs showing relationships between bead heights and collision absorption energy ratios in respective cases of 10, 12, 14, 18, 22, 26, 30, 40, and 50 mm in web face width.

FIG. 20A to FIG. 20I show graphs showing relationships between ratios of bead heights to cross-sectional peripheral lengths and collision absorption energy ratios with the collision absorption energy of the door impact beam of the comparative example in which the bead is not formed being set to 1.

DESCRIPTION OF EMBODIMENTS

Figure 2A:
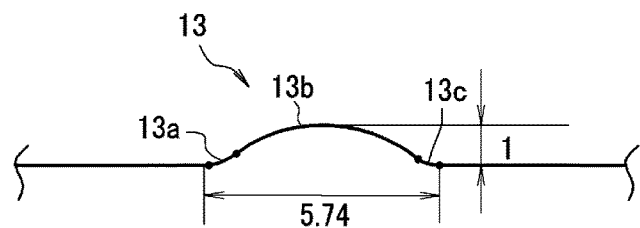
FIG. 2A to FIG. 2D show cross-sectional views schematically showing shape examples of a bead.

Hereinafter, preferred embodiments of an impact beam according to the present invention will be described in detail with reference to the attached drawings.

FIG. 1 shows a cross-sectional view showing a transverse cross-sectional shape of an example of a door impact beam 1 according to a first embodiment of the present invention. Note that also in this example, the door impact beam 1 is constituted as a long reinforcing member disposed in a manner that both front and rear ends thereof are fixed along a front and rear direction of an automobile between an outer panel and an inner panel which constitute an automobile door.

The door impact beam 1 is constituted by a main body 2. The main body 2 has a long outer shape extending in a direction orthogonal to a plane of FIG. 1. The main body 2 is a molded body of a metal plate (though a case of steel sheet is exemplified in explanation hereinafter, the same applies to a metal plate other than the steel sheet). As a forming method, normal cold press molding and roll forming are exemplified, but hot molding such as hot stamping may be used.

Further, a sheet thickness of the steel sheet constituting the main body 2 of the door impact beam 1 is exemplified to be about 1.4 to 2.3 mm, a strength of this steel sheet is desirable to be 780 MPa or more for the sake of reduction in size and weight of the main body 2, is further desirable to be 980 MPa or more, and is most desirable to be 1180 MPa or more.

The main body 2 has two door-attaching portions (not shown) and a bending deformation generation portion 3 in a longitudinal direction. The two door-attaching portions are respectively formed on both end portion sides in the longitudinal direction (direction orthogonal to the plane of FIG. 1) of the main body 2. The two door-attaching portions are portions for fixing the main body 2 to a predetermined attachment position in the door inner panel by an appropriate means (for example, fastening or the like by using a bolt and a nut), and are fixed to the predetermined positions on a front end side and a rear end side in the automobile front and rear direction in the door inner panel.

The bending deformation generation portion 3 is disposed between these two door-attaching portions. In other words, FIG. 1 shows a transverse cross-sectional shape of the main body 2 in the bending deformation generation portion 3. Note that a transverse cross-sectional shape of the two door-attaching portions are not limited to a specific shape in particular as long as being a shape enabling secure attachment to the predetermined attachment positions in the door inner panel.

The bending deformation generation portion 3 has a groove bottom portion 4, two edge line portions 5a, 5b, two vertical wall portions 6a, 6b, two curved portions 7a, 7b, and two flanges 8a, 8b.

The groove bottom portion 4 is formed in a plane state between R tangent ends 9a, 9b, except a later-described bead 13.

The two edge line portions 5a, 5b are formed in a curved state continuing to the groove bottom portion 4 via the R tangent ends 9a, 9b, respectively.

The two vertical wall portions 6a, 6b are formed in a plane state continuing to the two corresponding edge line portions 5a, 5b via R tangent ends 10a, 10b, respectively.

The two curved portions 7a, 7b are formed in a curved state continuing to the two corresponding vertical wall portions 6a, 6b via R tangent ends 11a, 11b, respectively.

Further, two flanges 8a, 8b are formed in a plane state continuing to the two corresponding curved portions 7a, 7b via R tangent ends 12a, 12b, respectively.

As described above, the bending deformation generation portion 3 in the main body 2 has a hat-shaped cross-sectional shape constituted by the groove bottom portion 4, the two edge line portions 5a, 5b, the two vertical wall portions 6a, 6b, the two curved portions 7a, 7b, and the two flanges 8a, 8b. Though the main body 2 typically has an open cross-sectional shape in the present embodiment, the present invention is not limited thereto, that is, the present invention includes a case of a closed cross-sectional shape as will be described later.

The door impact beam 1 has the bead 13 formed toward the longitudinal direction of the main body 2 in a part of the groove bottom portion 4. The bead 13 is desirable to be formed in a central position between the R tangent ends 9a, 9b being both ends of the groove bottom portion 4, but is not limited to be formed in the central position, as long as being formed in an appropriate position between the R tangent ends 9a, 9b. Further, the bead 13 is desirable to be formed in almost an entire length of the longitudinal direction of the bending deformation generation portion 3. Note that the bead 13 is not limited to be formed in an entire length region of the bending deformation generation portion 3, and it suffices that, most typically, for example, the bead 13 is formed in a region of 5% or more of the entire length of the longitudinal direction of the bending deformation generation portion 3 in a vicinity of a central portion thereof. In other words, as a result that the bead 13 has a length of at least about 5% of the entire length of the bending deformation generation portion 3, a necessary and sufficient collision energy absorption performance can be achieved. Further, the bead 13 may be formed also in the door-attaching portion as long as attachment to the predetermined attachment position in the door inner panel is not hampered.

As shown in FIG. 1, the bead 13 is formed to project in a shape having a curved surface toward the outside of the open cross-sectional shape in the bending deformation generation portion 3, that is, so as to oppose an impact load F acting on the door impact beam 1. Here, the "shape having a curve" includes a shape constituted only by a curve and a shape constituted by combination of a curve and a plane.

FIG. 2A to FIG. 2D show cross-sectional views schematically showing shape examples of the bead 13. Note that solid lines indicating beads 13 in FIG. 2A to FIG. 2D indicate sheet thickness central positions of the groove bottom portions 4, black circle marks applied on these solid lines indicate R tangent ends, and a unit of dimension numeral values given to the respective portions is mm.

Figure 2B:
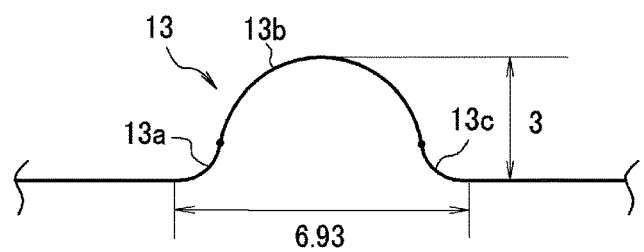
Figure 2C:
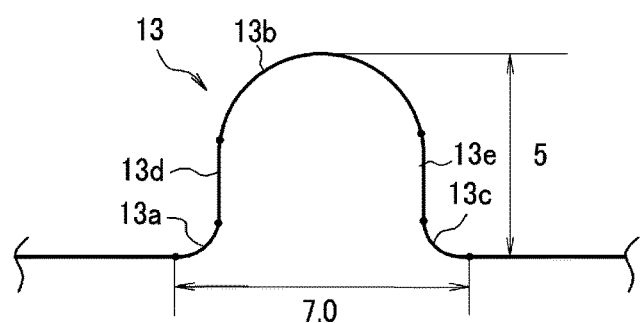
Figure 2D:
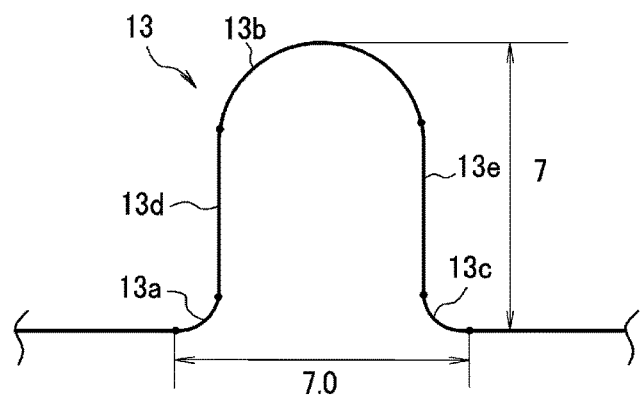

FIG. 2A and FIG. 2B each show a case where the bead 13 is constituted by a first curved surface 13a, a second curved surface 13b, and a third curved surface 13c. Further, FIG. 2C and FIG. 2D each show a case where the bead 13 is constituted by a first curved surface 13a, a first plane 13d, a second curved surface 13b, a second plane 13e, and a third curved surface 13c.

The bead 13 is not limited to one formed by a specific manufacturing method, but is desirable to be what is called a structure bead being a rib-shaped projection made by embossing, in order to suppress load loss and fracture caused by collapse of a cross-sectional shape at the time of collision, to thereby absorb collision energy efficiently.

The door impact beam 1 is disposed in a predetermined position between the door outer panel and the door inner panel so that the impact load F is input to the bead 13 in the groove bottom portion 4 as shown by an outlined arrow in FIG. 1, that is, in a manner that the groove bottom portion 4 in the main body 2 of the door impact beam 1 is positioned on a door outer panel side and that the two flanges 8a, 8b are positioned on a door inner panel side.

Disposing the bead 13 in the groove bottom portion 4 of the main body 2 increases a surface rigidity against a bending load and typically suppresses load capacity reduction and facture caused by collapse of the cross-sectional shape at the time of side collision, enabling efficient absorption of collision energy.

Figure 3A:
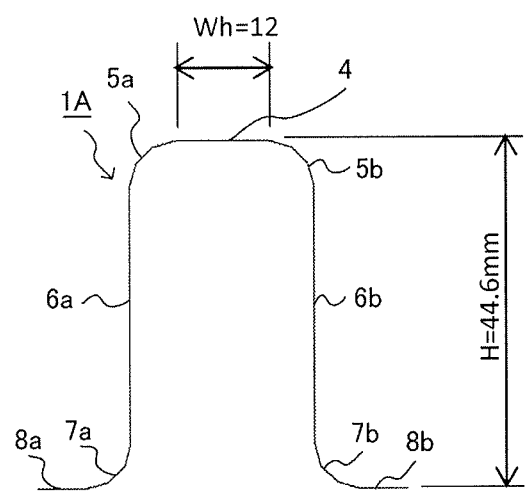
FIG. 3 shows a view schematically showing a cross-sectional shape of a door impact beam of a conventional example in which a bead is not formed in a groove bottom portion.
Figure 4A:
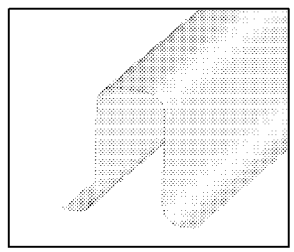
Figure 4B:
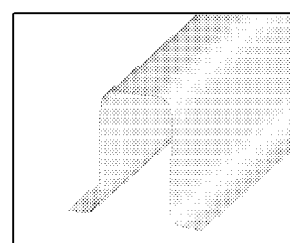
Figure 4C:
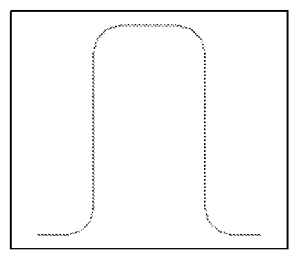
Figure 4D:
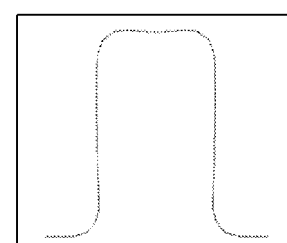

The reason for the above will be explained. FIG. 3 shows a view schematically showing a cross-sectional shape of a door impact beam 1A of a conventional example in which a bead is not formed in a groove bottom portion 4. Note that a basic configuration of the door impact beam 1A is practically the same as that of the door impact beam 1 according to the present invention except that the door impact beam 1A does not have a bead 13, and thus hereinafter a portion of the door impact beam 1A which corresponds to the portion of the door impact beam 1 of the present invention will be described appropriately by using the same reference numeral as necessary. FIG. 4A to FIG. 4G show explanatory views showing analysis results of three-point bending of the door impact beam 1A of FIG. 3, and FIG. 4A to FIG. 4G are a perspective view and a cross-sectional view showing a situation of collapse of a cross-section in 0 mm, 24 mm, 45 mm, 60 mm, 78 mm, 99 mm, and 120 mm, respectively, in stroke ST of bending deformation of a three-point bending test thereof. Note that reference numerals of respective portions of the door impact beam 1A are omitted in FIG. 4A FIG. 4G.

Figure 5:
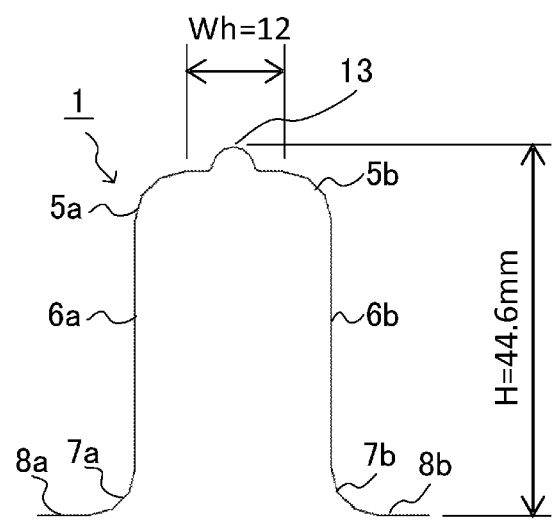
FIG. 5 shows a view schematically showing a cross-sectional shape of a door impact beam according to a first embodiment of the present invention in which a bead is formed in a groove bottom portion.
Figure 6A:
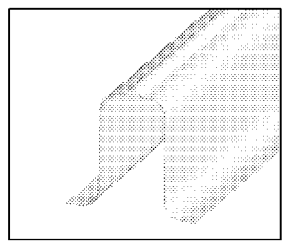
Figure 6B:
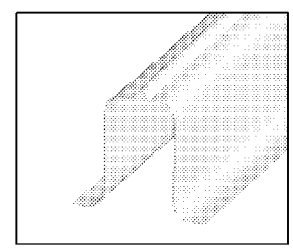
Figure 6C:
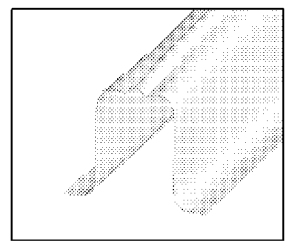
Figure 6D:
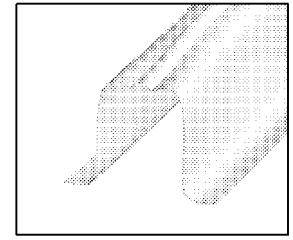

FIG. 5 shows a view schematically showing a cross-sectional shape of the door impact beam 1 according to the first embodiment of the present invention in which the bead 13 is formed in the groove bottom portion 4. FIG. 6A to FIG. 6G show explanatory views showing analysis results of three-point bending of the door impact beam of FIG. 5, and FIG. 6A to FIG. 6G are a perspective view and a cross-sectional view showing a situation of collapse of a cross-section in 0 mm, 24 mm, 45 mm, 60 mm, 78 mm, 99 mm, and 120 mm, respectively, in stroke ST of bending deformation in a three-point bending test thereof. Note that reference numerals of respective portions of the door impact beam 1 are omitted in FIG. 6A to FIG. 6G.

Incidentally, solid lines indicating the door impact beams 1A, 1 in FIG. 3 and FIG. 5 show sheet thickness central positions of their main bodies 2, web face widths Wh being distances between two R tangent ends 9a, 9b (see FIG. 1) in the groove bottom portions 4 are 12 mm in both door impact beams 1A, 1, and hat heights H are 44.6 mm in both door impact beams 1A, 1. Further, sheet thicknesses of the main bodies 2 are 1.6 mm in both door impact beams 1A, 1, and the main bodies 2 are constituted by high-tensile steel sheets of 1500 MPa class in tensile strength.

Figure 7:
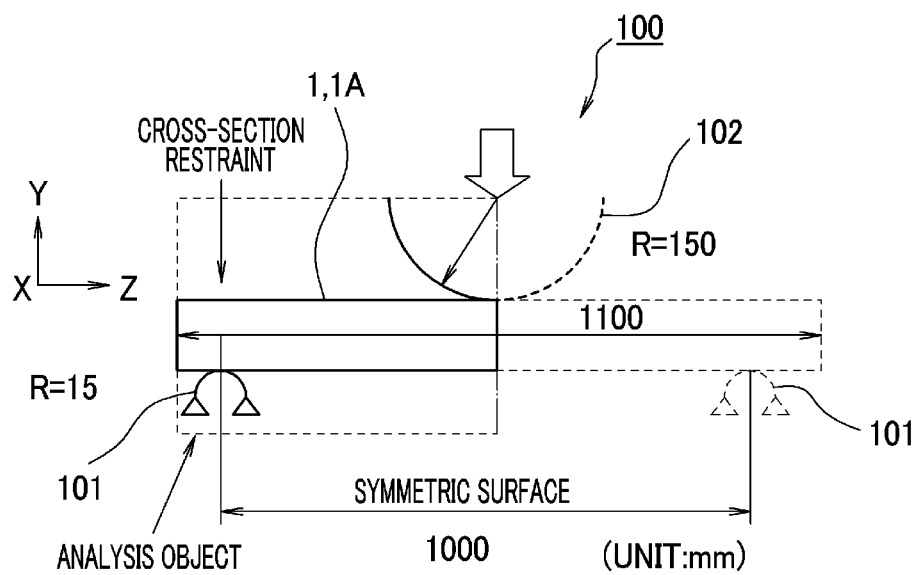
FIG. 7 shows an explanatory view showing an analysis condition of a three-point bending test conducted to the door impact beam.

FIG. 7 shows an explanatory view showing an analysis condition of three-point bending tests conducted to the door impact beams 1, 1A by a testing apparatus 100. The analysis is performed under a condition in which the door impact beams 1, 1A are each fixed and supported by fulcrums 101, 101 of column shape of 15 mm in radius, with a distance between the fulcrums being 1000 mm, in a manner that the groove bottom portion 4 is positioned on a collision surface side and that the flanges 8a, 8b are positioned on an opposite side of a collision surface, and an impactor 102 of 150 mm in radius is made to collide against the central position in the longitudinal directions of the door impact beams 1, 1A at a collision speed of 1.8 km/h.

As shown in FIG. 4A to FIG. 4G, in the door impact beam 1A of the conventional example, when deformation due to bending progresses (ST: 0 mm→ST: 45 mm) in the door impact beam 1A having the main body 2 with a hat-shaped open cross-sectional shape to which an impact load is applied, deformation progresses in an early stage in a manner that the grove bottom portion 4 is recessed, the edge line portions 5a, 5b are displaced toward the outside of the open cross-section, and the curved portions 7a, 7b on a side opposite to the edge line portions 5a, 5b with the vertical wall portions 6a, 6b therebetween are, in contrast, displaced toward the inside. It is found that collapse of a cross-section of the open cross-sectional shape causes loss in collision load thereafter (ST: 45 mm→ST: 120 mm) and increases risk of fracture due to localization of deformation.

In contrast, in the door impact beam 1 of the present invention, as described in FIG. 6A to FIG. 6G, as deformation due to bending progresses (ST: 0 mm→ST: 45 mm) in the door impact beam 1 having the main body 2 with the hat-shaped open cross-sectional shape to which an impact load is applied, the bead 13 is deformed in a manner to be crushed, that is, the bead 13 becomes smaller in height and larger in width. Note that a peripheral length (cross-sectional peripheral length equivalent to a route, in a sense, passing through both groove bottom portion 4 itself and bead 13 in the groove bottom portion 4 in which the bead 13 is formed) of the groove bottom portion 4 does not change practically. That is, a part of the impact load is received by the bead 13, to thereby prevent stress concentration around the edge line portions 5a, 5b in particular, and such stress dispersion substantially suppresses a recess amount of the groove bottom portion 4, a displacement amount of the edge line portions 5a, 5b toward the outside of the open cross-section, and a fall amount of the vertical wall portions 6a, 6b toward the outside of the open cross-section than in a case of the door impact beam 1A of the conventional example shown in FIG. 3 and FIG. 4A to FIG. 4G. Accordingly, collapse of the cross-section in the door impact beam 1 of the present invention can be delayed until ST: 78 mm, to thereby suppress load capacity reduction and fracture caused by collapse of the cross-sectional shape at the time of collision, resulting in that the collision energy can be absorbed efficiently.

As described above, in the present invention, as a result of having the bead 13 formed toward the longitudinal direction of the main body 2 in a part of the groove bottom portion 4, the bead 13 projecting in the shape having the curved surface toward the outside of the cross-sectional shape of the bending deformation generation portion 3 so as to oppose the impact load F acting on the door impact beam 1, the collision energy at the time of side collision can be absorbed efficiently.

Figure 8:
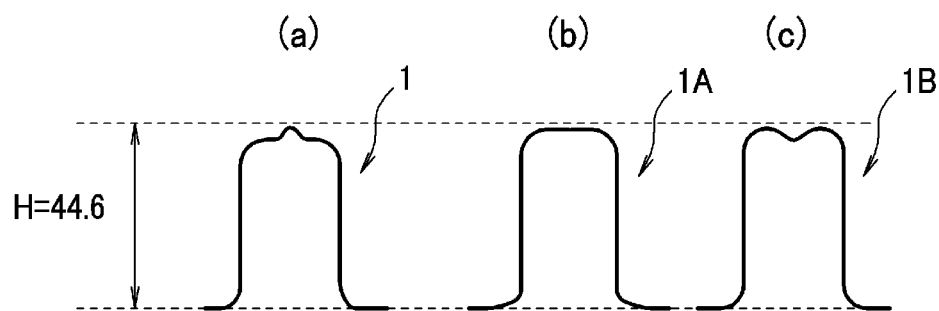
FIG. 8 shows views showing cross-sectional shapes of various door impact beams analyzed in the present invention.

Here, such an effect by the door impact beam 1 of the present invention will be described in relation to the conventional example and so on. FIG. 8 shows explanatory views showing cross-sectional shapes of various door impact beams having been analyzed, and FIG. 8(a) shows the door impact beam 1 of the present invention, FIG. 8(b) shows the door impact beam 1A of the conventional example, and FIG. 8(c) shows a door impact beam 1B disclosed by Patent Literature 2. Solid lines shown in the respective FIG. 8(a) to FIG. 8(c) indicate sheet thickness central positions of steel sheets constituting main bodies 2 of the door impact beams 1, 1A, 1B.

Incidentally, the sheet thicknesses of the steel sheets forming the door impact beams 1, 1A, 1B are each 1.6 mm, and the steel sheets are each a 1500 MPa class high tensile steel sheet. Widths of the main bodies 2 are 47.2 mm and heights are 44.6 mm.

The door impact beam 1 of the present embodiment has the bead 13 formed by embossing, and its height is 44.6 mm. Further, curvature radiuses of the edge line portions 5a, 5b are 5.8 mm in a sheet thickness center, and flange widths are 6 mm.

Numeric analysis is performed on these door impact beams 1, 1A, 1B under the analysis condition shown by FIG. 7 as described above.

Figure 9:
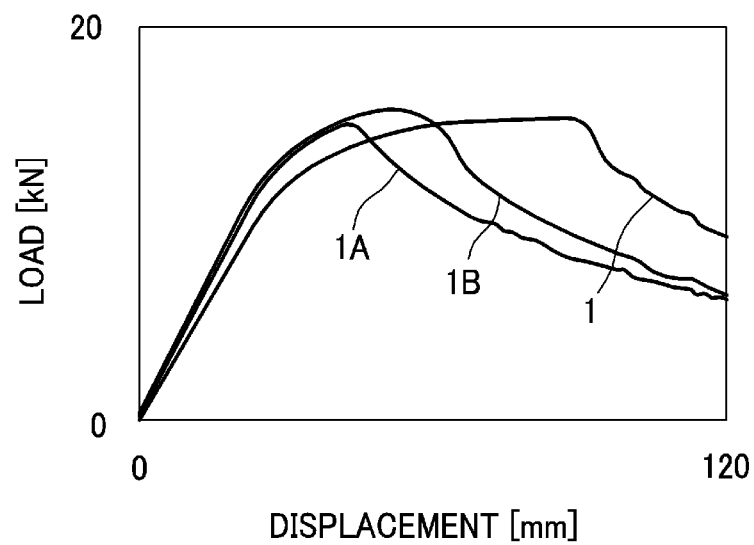
FIG. 9 is a graph showing relationships between displacement amounts and loads at the time of deformation in the various door impact beams analyzed in the present invention.
Figure 10:
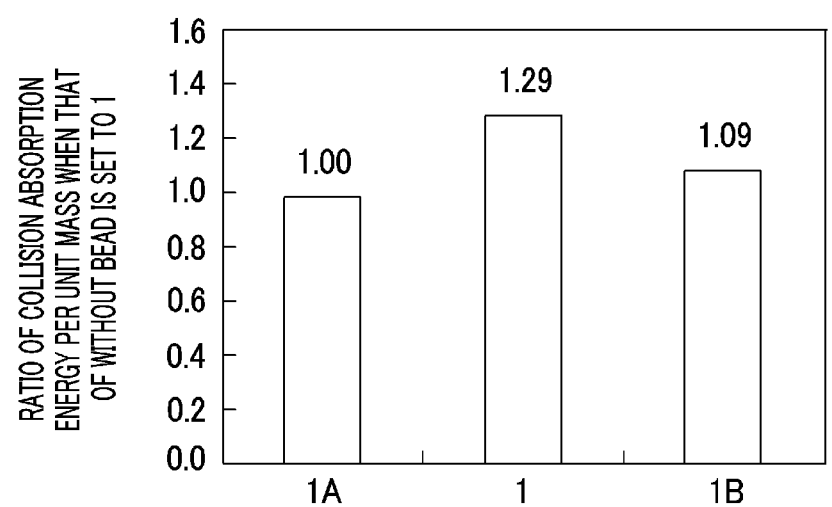
FIG. 10 is a graph showing collision absorption energy ratios per unit mass with collision absorption energy of the door impact beam of the conventional example being set to 1 in the various door impact beams analyzed in the present invention.
Figure 11A:
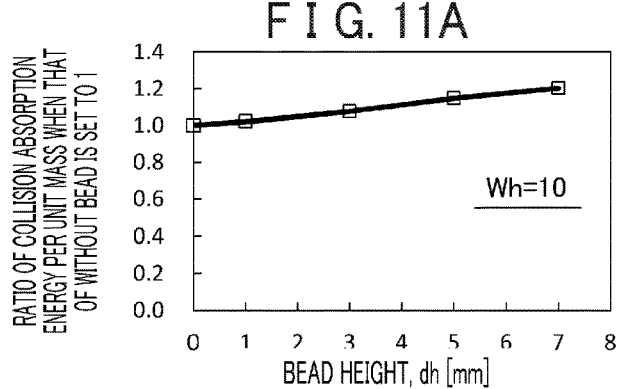
FIG. 11A to FIG. 11G show graphs showing relationships between bead heights and energy ratios in respective cases of 10, 12, 14, 18, 22, 26, and 30 mm in web face width.
Figure 11B:
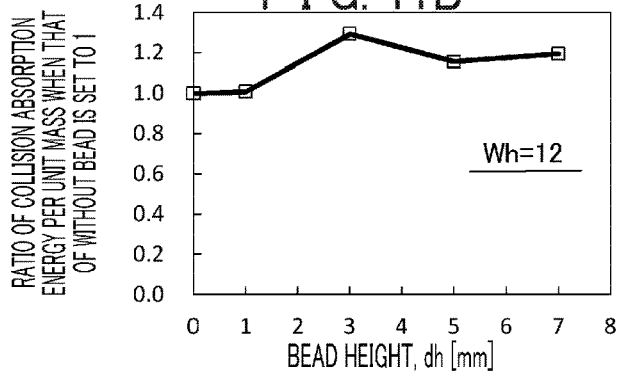
Figure 11C:
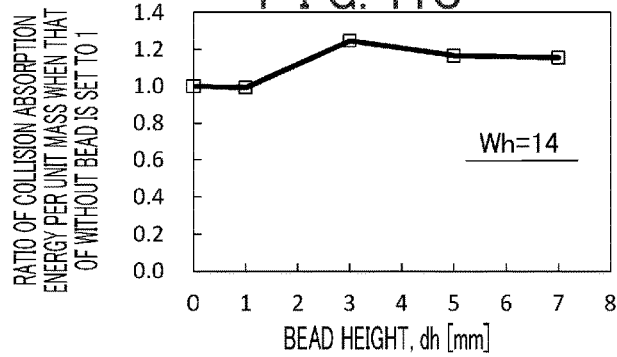
Figure 11D:
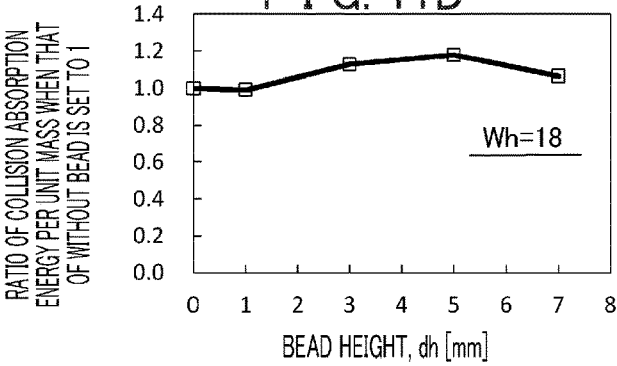
Figure 11E:
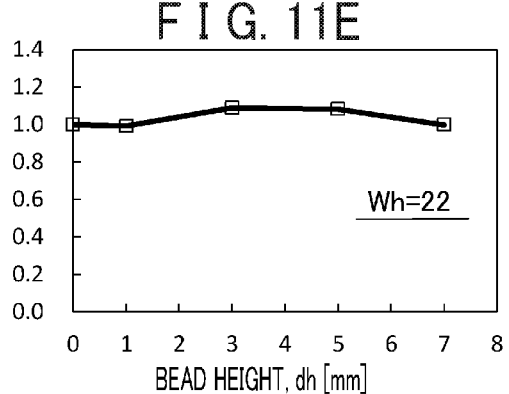
Figure 11F:
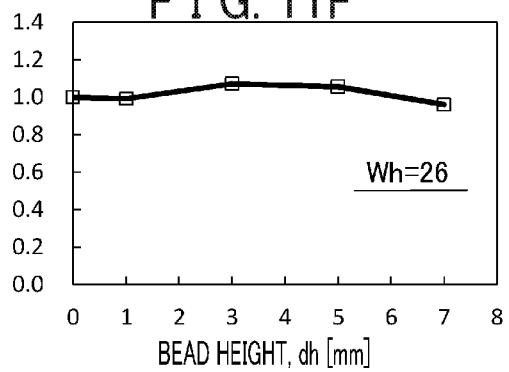
Figure 11G:
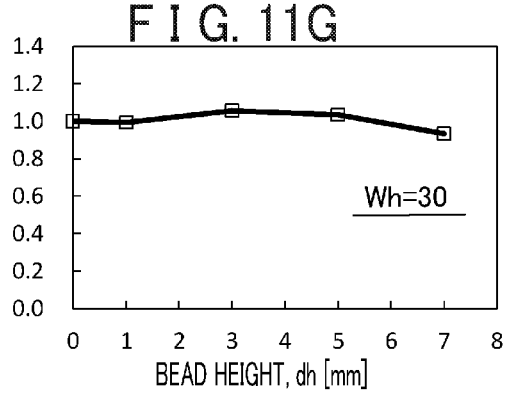
Figure 12A:
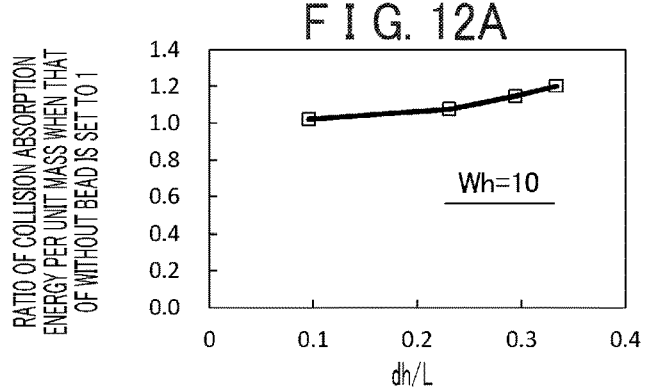
FIG. 12A FIG. 12G show graphs showing relationships between ratios of bead heights to cross-sectional peripheral lengths and collision absorption energy ratios with the collision absorption energy of the door impact beam of the conventional example in which a bead is not formed being set to 1.
Figure 12B:
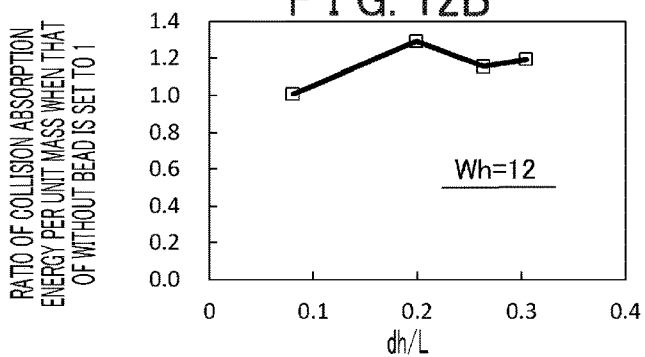
Figure 12C:
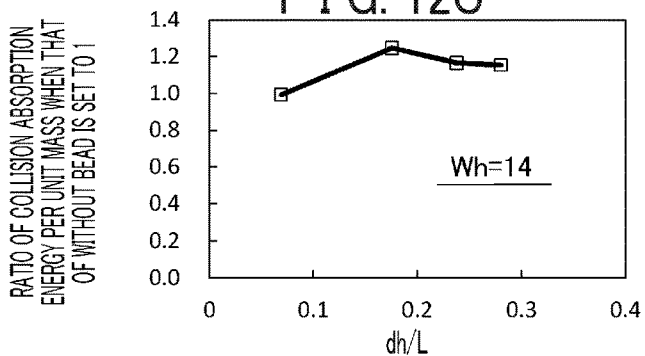
Figure 12D:
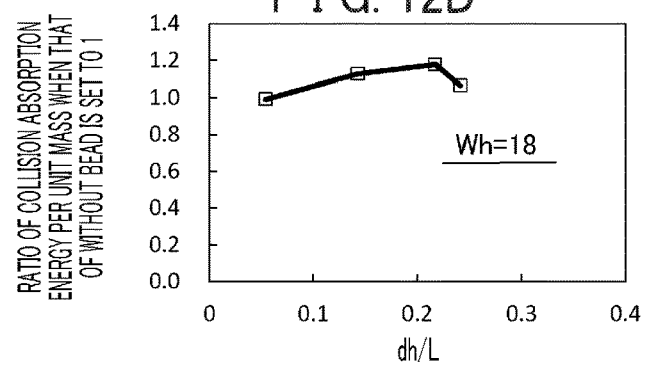
Figure 12E:
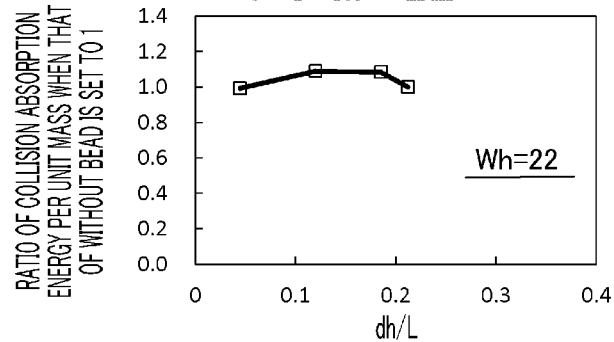
Figure 12F:
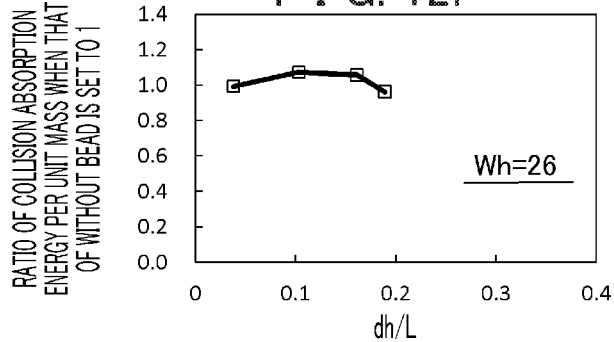
Figure 12G:
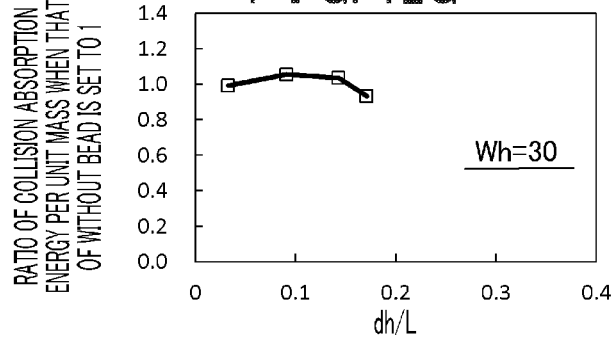

FIG. 9 and FIG. 10 each are a graph showing results of the analysis, and FIG. 9 shows relationships between displacement amounts and loads at the time of deformation. Further, FIG. 10 shows energy ratios of the door impact beams 1, 1A, 1B respectively, with energy of the door impact beam 1A of the conventional example in which the bead 13 is not formed being set to 1 (as described later, impact absorption energy ratios per unit mass with impact absorption energy of the door impact beam 1A being set to 1).

As is obvious from these analysis results, according to the present invention, as a result of having the bead 13 in the groove bottom portion 4, the door impact beam 1 can maintain a high load value, in comparison with the door impact beams 1A, 1B, until a late stage of deformation as shown in the graph of FIG. 9, and an impact energy absorption performance can be improved as shown in the graph of FIG. 10.

Next, in the door impact beam 1 of the present invention, its operation and effect or the like will be analyzed further concretely.

A cross-sectional peripheral length L of the groove bottom portion 4 changes depending on a web face width Wh or a bead height dh, and in the first embodiment of the present invention, there is used the door impact beam 1 of the cross-sectional peripheral length L of 10 mm≤L≤40 mm, which is practically used as a door impact beam of this kind. Further, regarding a hat height H of the door impact beam 1, an application object of the present invention is a door impact beam with a hat height of 50 mm or less, which is regarded as a standard size as the door impact beam of this kind.

Here, Table 1 to Table 7 show analysis results of a relationship between a bead height dh, and a collision absorption energy ratio and a collision absorption energy ratio per unit mass (hereinafter, simply referred to as energy ratio (unit mass)) with the collision absorption energy ratio of the door impact beam 1A of the conventional example in which a bead is not formed, that is, dh=0, being set to 1, when the cross-sectional peripheral length L of a web portion in the groove bottom portion 4 is altered practically in a range of 10 to 40 mm, the bead height dh being altered in four levels of 1, 3, 5, and 7 every web face width Wh in a case of 10, 12, 14, 18, 22, 26, and 30 mm in web face width Wh. Even in a case of the same web face width Wh, the cross-sectional peripheral lengths L of the web portion are different when the bead heights dh are different. Thus, the bead height dh is changed with the web face width Wh being the same, that is, the bead height dh is altered in four levels every representative web face width Wh, and the analysis is performed.

TABLE 1

Wh = 10

| No. | Bead Height dh [mm] | Web Face Width [mm] | Bead Peripheral Length [mm] | Cross-sectional Peripheral Length L [mm] | dh/L | Collision Absorption Energy [kJ] | Energy Ratio | Collision Absorption Energy (Unit Mass) [kJ/kg] | Energy Ratio (Unit Mass) |
|---|---|---|---|---|---|---|---|---|---|
| 101 | 0 | 10 | 0.00 | 10.00 |  | 1.120 | 1.00 | 0.658 | 1.000 |
| 102 | 1 | 10 | 6.20 | 10.45 | 0.10 | 1.130 | 1.01 | 0.672 | 1.022 |

TABLE 1-continued

| | | | | Cross-sectional | | | | Collision Absorption | |
| | Bead Height | Web Face | Bead Peripheral | Peripheral | | Collision | | Energy (Unit Mass) | Energy Ratio |
| No, | dh [mm] | Width [mm] | Length [mm] | Length L [mm] | dh/L | Absorption Energy [kJ] | Energy Ratio | [kJ/kg] | (Unit Mass) |
|---|---|---|---|---|---|---|---|---|---|
| | | | | Wh = 10 | | | | | |
| 103 | 3 | 10 | 9.99 | 12.99 | 0.23 | 1.176 | 1.05 | 0.708 | 1.077 |
| 104 | 5 | 10 | 14.00 | 17.00 | 0.29 | 1.254 | 1.12 | 0.755 | 1.148 |
| 105 | 7 | 10 | 17.99 | 21.00 | 0.33 | 1.313 | 1.17 | 0.791 | 1.202 |

TABLE 2

| | | | | Cross-sectional | | | | Collision Absorption | |
| | Bead Height | Web Face | Bead Peripheral | Peripheral | | Collision | | Energy (Unit Mass) | Energy Ratio |
| No, | dh [mm] | Width [mm] | Length [mm] | Length L [mm] | dh/L | Absorption Energy [kJ] | Energy Ratio | [kJ/kg] | (Unit Mass) |
|---|---|---|---|---|---|---|---|---|---|
| | | | | Wh = 12 | | | | | |
| 106 | 0 | 12 | 0.00 | 12.00 | | 1.103 | 1.00 | 0.637 | 1.000 |
| 107 | 1 | 12 | 6.20 | 12.45 | 0.08 | 1.098 | 1.00 | 0.643 | 1.009 |
| 108 | 3 | 12 | 9.99 | 15.07 | 0.20 | 1.392 | 1.26 | 0.824 | 1.293 |
| 109 | 5 | 12 | 14.00 | 19.00 | 0.26 | 1.244 | 1.13 | 0.737 | 1.156 |
| 110 | 7 | 12 | 17.99 | 23.00 | 0.30 | 1.285 | 1.16 | 0.761 | 1.195 |

TABLE 3

| | Bead Height dh [mm] | Web Face Width [mm] | Bead Peripheral Length [mm] | Cross-sectional Peripheral Length L [mm] | dh/L | Collision Absorption Energy [kJ] | Energy Ratio | Collision Absorption Energy (Unit Mass) [kJ/kg] | Energy Ratio (Unit Mass) |
|---|---|---|---|---|---|---|---|---|---|
| No, | | | | | | | | | |
| | | | | Wh = 14 | | | | | |
| 111 | 0 | 14 | 0.00 | 14.00 | | 1.091 | 1.00 | 0.621 | 1.000 |
| 112 | 1 | 14 | 6.20 | 14.45 | 0.07 | 1.070 | 0.98 | 0.617 | 0.993 |
| 113 | 3 | 14 | 9.99 | 17.07 | 0.18 | 1.328 | 1.22 | 0.774 | 1.247 |
| 114 | 5 | 14 | 14.00 | 21.00 | 0.24 | 1.241 | 1.14 | 0.724 | 1.166 |
| 115 | 7 | 14 | 17.99 | 25.00 | 0.28 | 1.229 | 1.13 | 0.717 | 1.155 |

TABLE 4

| | Bead Height dh [mm] | Web Face Width [mm] | Bead Peripheral Length [mm] | Cross-sectional Peripheral Length L [mm] | dh/L | Collision Absorption Energy [kJ] | Energy Ratio | Collision Absorption Energy (Unit Mass) [kJ/kg] | Energy Ratio (Unit Mass) |
|---|---|---|---|---|---|---|---|---|---|
| No, | | | | | | | | | |
| | | | | Wh = 18 | | | | | |
| 116 | 0 | 18 | 0.00 | 18.00 | | 1.092 | 1.00 | 0.603 | 1.000 |
| 117 | 1 | 18 | 6.20 | 18.45 | 0.05 | 1.071 | 0.98 | 0.598 | 0.993 |
| 118 | 3 | 18 | 9.99 | 21.00 | 0.14 | 1.205 | 1.10 | 0.681 | 1.129 |
| 119 | 5 | 18 | 14.00 | 23.00 | 0.22 | 1.258 | 1.15 | 0.711 | 1.179 |
| 120 | 7 | 18 | 17.99 | 28.99 | 0.24 | 1.136 | 1.04 | 0.642 | 1.065 |

TABLE 5

Wh = 22

| No. | Bead Height dh [mm] | Web Face Width [mm] | Bead Peripheral Length [mm] | Cross-sectional Peripheral Length L [mm] | dh/L | Collision Absorption Energy [kJ] | Energy Ratio | Collision Absorption Energy (Unit Mass) [kJ/kg] | Energy Ratio (Unit Mass) |
|---|---|---|---|---|---|---|---|---|---|
| 121 | 0 | 22 | 0.00 | 22.00 |  | 1.102 | 1.00 | 0.590 | 1.000 |
| 122 | 1 | 22 | 6.20 | 22.45 | 0.04 | 1.082 | 0.98 | 0.586 | 0.993 |
| 123 | 3 | 22 | 9.99 | 25.00 | 0.12 | 1.175 | 1.07 | 0.644 | 1.090 |
| 124 | 5 | 22 | 14.00 | 27.00 | 0.19 | 1.167 | 1.06 | 0.639 | 1.083 |
| 125 | 7 | 22 | 17.99 | 33.00 | 0.21 | 1.076 | 0.98 | 0.590 | 0.999 |

TABLE 6

Wh = 26

| No. | Bead Height dh [mm] | Web Face Width [mm] | Bead Peripheral Length [mm] | Cross-sectional Peripheral Length L [mm] | dh/L | Collision Absorption Energy [kJ] | Energy Ratio | Collision Absorption Energy (Unit Mass) [kJ/kg] | Energy Ratio (Unit Mass) |
|---|---|---|---|---|---|---|---|---|---|
| 126 | 0 | 26 | 0.00 | 26.00 |  | 1.115 | 1.00 | 0.580 | 1.000 |
| 127 | 1 | 26 | 6.20 | 26.45 | 0.04 | 1.094 | 0.98 | 0.576 | 0.993 |
| 128 | 3 | 26 | 9.99 | 29.00 | 0.10 | 1.170 | 1.05 | 0.622 | 1.072 |
| 129 | 5 | 26 | 14.00 | 31.00 | 0.16 | 1.151 | 1.03 | 0.613 | 1.056 |
| 130 | 7 | 26 | 17.99 | 37.00 | 0.19 | 1.047 | 0.94 | 0.557 | 0.961 |

TABLE 7

Wh = 30

| No. | Bead Height dh [mm] | Web Face Width [mm] | Bead Peripheral Length [mm] | Cross-sectional Peripheral Length L [mm] | dh/L | Collision Absorption Energy [kJ] | Energy Ratio | Collision Absorption Energy (Unit Mass) [kJ/kg] | Energy Ratio (Unit Mass) |
|---|---|---|---|---|---|---|---|---|---|
| 131 | 0 | 30 | 0.00 | 30.00 |  | 1.128 | 1.00 | 0.570 | 1.000 |
| 132 | 1 | 30 | 6.20 | 30.45 | 0.03 | 1.108 | 0.98 | 0.567 | 0.993 |
| 133 | 3 | 30 | 9.99 | 33.00 | 0.09 | 1.166 | 1.03 | 0.602 | 1.056 |
| 134 | 5 | 30 | 14.00 | 35.00 | 0.14 | 1.142 | 1.01 | 0.590 | 1.035 |
| 135 | 7 | 30 | 17.99 | 41.00 | 0.17 | 1.029 | 0.91 | 0.532 | 0.933 |

FIG. 11A to FIG. 11G are graphs each showing a relationship between the bead height dh and the energy ratio (unit mass) in a case of web face width Wh=10, 12, 14, 18, 22, 26, and 30 mm, based on the analysis results of Table 1 to Table 7. Further, FIG. 12A to FIG. 12G are graphs each showing a relationship between a ratio (dh/L) of the bead height dh to the cross-sectional peripheral length L and the energy ratio (unit mass) with the energy of the door impact beam 1A of the conventional example in which the bead is not formed being set to 1, in a case of the web face width Wh=10, 12, 14, 18, 22, 26, and 30 mm, based on the analysis results of Table 1 to Table 7.

Table 8 shows analysis results of the energy ratio (unit mass) and so on with the energy of the door impact beam 1A of cross-sectional peripheral length L=10 of the conventional example in which the bead is not formed being set to 1, when the cross-sectional peripheral length L of the web portion is altered as above.

TABLE 8

| | Bead Height dh [mm] | Web Face Width [mm] | Bead Peripheral Length [mm] | Cross-sectional Peripheral Length L [mm] | dh/L | Collision Absorption Energy [kJ/kg] | Energy Ratio (Unit Mass) |
|---|---|---|---|---|---|---|---|
| With Bead | 1 | 10 | 6.20 | 10.45 | 0.10 | 0.672 | 1.02 |
| | 1 | 12 | 6.20 | 12.45 | 0.08 | 0.643 | 0.98 |
| | 1 | 14 | 6.20 | 14.45 | 0.07 | 0.617 | 0.94 |
| | 1 | 18 | 6.20 | 18.45 | 0.05 | 0.598 | 0.91 |
| | 1 | 22 | 6.20 | 22.45 | 0.04 | 0.586 | 0.89 |
| | 1 | 26 | 6.20 | 26.45 | 0.04 | 0.576 | 0.88 |
| | 7 | 10 | 17.99 | 21.00 | 0.33 | 0.791 | 1.20 |
| | 7 | 12 | 17.99 | 23.00 | 0.30 | 0.761 | 1.16 |
| | 7 | 14 | 17.99 | 25.00 | 0.28 | 0.717 | 1.09 |
| | 7 | 18 | 17.99 | 28.99 | 0.24 | 0.642 | 0.98 |
| | 7 | 22 | 17.99 | 33.00 | 0.21 | 0.590 | 0.90 |
| | 7 | 26 | 17.99 | 37.00 | 0.19 | 0.557 | 0.85 |
| | 3 | 10 | 9.99 | 12.99 | 0.23 | 0.708 | 1.08 |
| | 3 | 12 | 9.99 | 15.07 | 0.20 | 0.824 | 1.25 |
| | 3 | 14 | 9.99 | 17.07 | 0.18 | 0.774 | 1.18 |
| | 3 | 18 | 9.99 | 21.00 | 0.14 | 0.681 | 1.03 |

TABLE 8-continued

|  | Bead Height dh [mm] | Web Face Width [mm] | Bead Peripheral Length [mm] | Cross-sectional Peripheral Length L [mm] | dh/L | Collision Absorption Energy [kJ/kg] | Energy Ratio (Unit Mass) |
|---|---|---|---|---|---|---|---|
|  | 3 | 22 | 9.99 | 25.00 | 0.12 | 0.644 | 0.98 |
|  | 3 | 26 | 9.99 | 29.00 | 0.10 | 0.622 | 0.95 |
|  | 5 | 10 | 14.00 | 17.00 | 0.29 | 0.755 | 1.15 |
|  | 5 | 12 | 14.00 | 19.00 | 0.26 | 0.737 | 1.12 |
|  | 5 | 14 | 14.00 | 21.00 | 0.24 | 0.724 | 1.10 |
|  | 5 | 18 | 14.00 | 23.00 | 0.22 | 0.711 | 1.08 |
|  | 5 | 22 | 14.00 | 27.00 | 0.19 | 0.639 | 0.97 |
|  | 5 | 26 | 14.00 | 31.00 | 0.16 | 0.613 | 0.93 |
| Without Bead | 0 | 10 | 0.00 | 10.00 | — | 0.658 | 1.00 |
|  | 0 | 12 | 0.00 | 12.00 | — | 0.637 | 0.97 |
|  | 0 | 14 | 0.00 | 14.00 | — | 0.621 | 0.94 |
|  | 0 | 18 | 0.00 | 18.00 | — | 0.603 | 0.92 |
|  | 0 | 25 | 0.00 | 25.00 | — | 0.583 | 0.89 |
|  | 0 | 26 | 0.00 | 26.00 | — | 0.580 | 0.88 |
|  | 0 | 30 | 0.00 | 30.00 | — | 0.570 | 0.87 |
|  | 0 | 35 | 0.00 | 35.00 | — | 0.558 | 0.85 |
|  | 0 | 40 | 0.00 | 40.00 | — | 0.546 | 0.83 |

Figure 13:
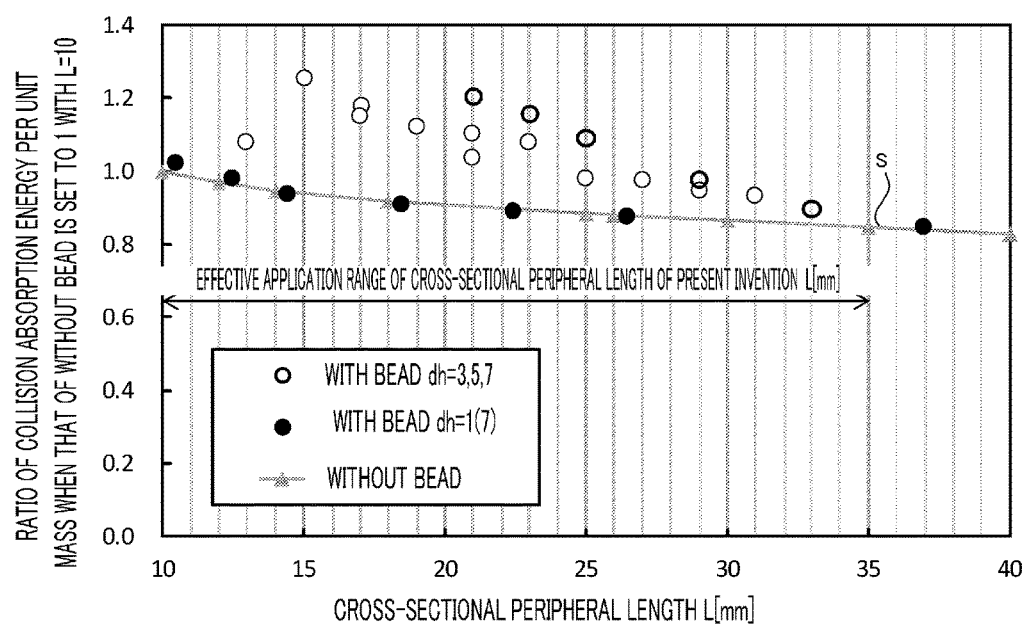
FIG. 13 shows a graph combinedly showing relationships between cross-sectional peripheral lengths and collision absorption energy ratios when the cross-sectional peripheral length is altered in a range of 10 to 40 mm, and so on in the present invention (with bead) and the conventional example (without bead).

FIG. 13 shows a graph combinedly showing relationships between cross-sectional peripheral lengths L and energy ratios (unit mass) when the cross-sectional peripheral length L is altered in a range of 10 to 40 mm in analysis data of Table 8, in the present invention (with the bead) and the conventional example (without the bead).

As shown in FIG. 13, in the conventional example without the bead, the energy ratio (unit mass) is decreased as the cross-sectional peripheral length (in this case, corresponds to the web face width Wh) becomes larger than L=10 mm being a reference. This means that influence to collapse of the cross-section of the impact beam becomes larger as the cross-sectional peripheral length becomes larger. Meanwhile, in the present invention, though the energy ratio (unit mass) is decreased as the cross-sectional peripheral length becomes larger by influence of the cross-sectional peripheral length, the energy ratio (unit mass) is equivalent or larger compared with the conventional example, that is, the cross-sectional peripheral length is made hard to affect.

In FIG. 13, further, in a case of the bead height dh=3, 5, and 7 (in FIG. 13, indicated by white circles), the energy ratios (unit mass) of the door impact beam 1 of the present invention are higher than a characteristic curve (reference line) S obtained by analysis values of the door impact beam 1A of the conventional example at least in a range of up to the cross-sectional peripheral length L=35, that is, the effect of the present invention is obtained compared with the conventional example. Therefore, an effective application range of the cross-sectional peripheral length in the present invention in this case is 10 mm≤L≤35 mm, and in this range, the door impact beam 1 of the present invention can obtain an energy absorption performance higher than that of the door impact beam 1A of the conventional example. However, the door impact beam of dh=7 mm with the cross-sectional peripheral length L=37 mm and all those of dh=1 mm fails to attain the effect of the present invention, and are indicated by black circles in FIG. 13. Incidentally, in the case of the bead height dh=7, the energy ratio (unit mass) sometimes becomes smaller than 1 (for example, when L=33 mm), but this is considered to be due to above-described influence of length of the cross-sectional peripheral length and so on, and the effect of the present invention is practically maintained.

Figure 14:
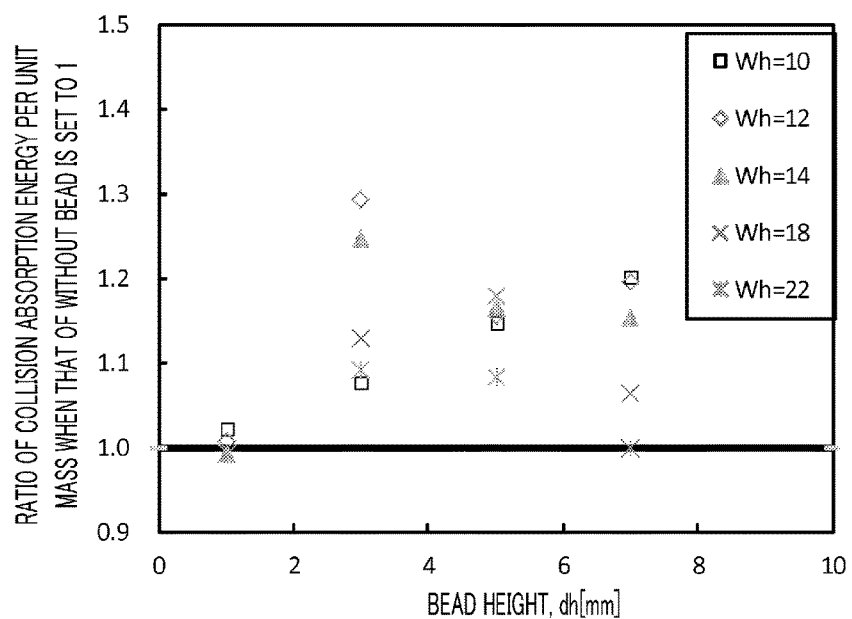
FIG. 14 shows a graph showing relationships between bead heights and collision absorption energy ratios with the collision absorption energy of the door impact beam of the conventional example in which the bead is not formed being set to 1, when the bead height is altered in four levels of 1, 3, 5, and 7 mm in a case of 10, 12, 14, 18, and 22 mm in web face width.

FIG. 14 shows a graph showing relationships between bead heights dh and energy ratios (unit mass) with energy of the door impact beam 1A of the conventional example in which the bead is not formed being set to 1, when the aforementioned analysis is performed while altering the bead height dh in four levels of 1, 3, 5, and 7 mm in a case of 10, 12, 14, 18, and 22 mm in web face width Wh.

With reference also to Table 3 to Table 7, in a case of the bead height dh=1 mm, if the web face width Wh=14 mm or more, the energy ratio (unit mass) becomes less than 1.0 (samples No. 112, 117, 122, and 132), and in the meantime, with reference also to Table 5 to Table 7, in a case of the bead height dh=7 mm, if the web face width Wh=22 mm or more, the energy ratio (unit mass) becomes less than 1.0 (samples No. 125, 130, and 135). Further, in a case of the bead height dh=3 mm and the bead height dh=5 mm, the energy ratio (unit mass) is secured to be 1.0 or more. The bead height dh is desirable to be in a range of at least 1 mm<dh, and 3 mm≤dh≤5 mm in particular.

This is considered to be because the bead height dh as low as dh=1 mm does not effectively act on stress dispersion against the impact load, though the bead height affects the energy ratio (unit mass).

However, in a case of the bead height dh=7 mm, it is treated as follows. Since the present analysis is performed with the hat height H of the door impact beam 1 being constant, lengths (heights) of the vertical wall portions 6a, 6b also change in correspondence with alteration of the bead height dh. In particular, if the bead height is as large as dh=7 mm, the lengths of the vertical wall portions 6a, 6b are shortened in correspondence thereto, whose influence may lead to reduction of stiffness of the bending deformation generation portion 3 as a whole. As described above, the energy ratio (unit mass) is decreased due to influence by the lengths of the vertical wall portions 6a, 6b being shortened, the bead height itself does not affect practically, and thus the bead height dh in the present invention is desirable to be in a range of 1 mm<dh≤7 mm. Further, in this regard, as is known from the fact, which will be described later, that an energy absorption performance can be improved even in a case of a large bead height (dh=7 mm, in particular) by strengthening stiffness of a bending deformation generation portion 3 itself in a second embodiment of the present invention, the large bead height is considered not to directly cause decrease of the energy ratio (unit mass).

Figure 15:
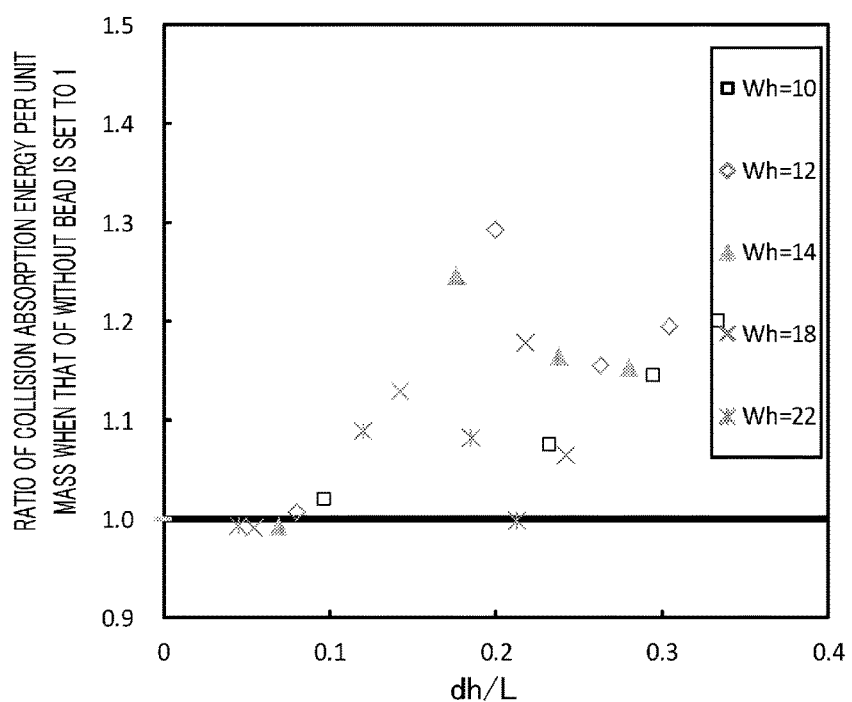
FIG. 15 shows a graph showing relationships between ratios of bead heights to cross-sectional peripheral lengths and collision absorption energy ratios with the collision absorption energy of the door impact beam of the conventional example in which the bead is not formed being set to 1, in a case of 10, 12, 14, 18, and 22 mm in web face width.

Further, FIG. 15 shows a graph showing relationships between ratios (dh/L) of bead heights dh to cross-sectional peripheral lengths L and energy ratios (unit mass) with energy of the door impact beam 1A of the conventional example in which the bead is not formed being set to 1, in a case of 10, 12, 14, 18, and 22 mm in web face width Wh.

With reference also to Table 1 to Table 7, dh/L<0.1 brings about the energy ratio (unit mass) of less than 1.0, and 0.1≤dh/L brings about the energy ratio (unit mass) of 1.0 or more. However, even in a case of 0.1≤dh/L, when the bead height dh=7 mm, the energy ratio (unit mas) becomes less than 1.0 (samples No. 125, 130, and 135 in Table 5, Table 6, and Table 7). Therefore, the ratio of the bead height dh to the cross-sectional peripheral length L is desirable to be in a range of 0.1≤dh/L.

As described above, the ratio dh/L of the bead height dh to the cross-sectional peripheral length L affects the energy ratio (unit mass), and this is considered to be because, as described above, the larger the cross-sectional peripheral length L is, the more collapse of the cross-section of the impact beam is affected, and the smaller the bead height dh is, the more the stress dispersion is affected.

In the analysis whose results are shown in FIGS. 11A~11G to FIG. 15, as described above, the door impact beam 1 is required to be disposed in a narrow space between the outer panel and the inner panel of the door while avoiding interference with various door component parts. Thus, since the door impact beam has a small cross-section, that is, a sufficient height is not secured and often the height of the main body 2 is limited to a predetermined value, the height of the main body 2 is set constant at 44.6 mm regardless of existence/absence of the bead 13.

From Table 1 to Table 8 and graphs of FIGS. 11A~11G to FIG. 15, in the door impact beam 1 of 10 mm≤L≤40 mm, an effective application range of the cross-sectional peripheral length is 10 mm≤L≤35 mm, and a range of 13 mm≤L≤33 mm among the above is preferable in particular (see FIG. 13). Regarding the height dh of the bead 13 from the plane of the groove bottom portion 4 and the ratio dh/L of the bead height dh to the cross-sectional peripheral length L, at least a range of 1 mm<dh and dh≤7 mm is desirable, and 3 mm≤dh≤5 mm is desirable in particular. Further, a range of 0.1≤dh/L is desirable, and these ranges enable obtaining an excellent energy absorption performance.

Regarding the reason for the above, as shown in the graph of FIG. 13, when the cross-sectional peripheral length L of the groove bottom portion 4 becomes large, surface rigidity of the groove bottom portion 4 becomes low, resulting in a reduced bending performance. When the cross-sectional peripheral length L becomes small, the height dh of the bead 13 becomes small, so that distortion is not dispersed and fracture prevention is not brought about as shown in the graph of FIG. 13.

Thus, according to the present invention, even in the door impact beam 1 having the main body 2 made of a high-tensile steel sheet of the material (for example, whose tensile strength is 780 MPa or more, 980 MPa or more, or 1180 MPa or more) with elongation small enough to cause concern about fracture, it becomes possible to achieve both suppression of fracture at the time of impact load application and highly efficient energy absorption performance at a high level while reduction in size and weight of the door impact beam is further enhanced.

Figure 16:
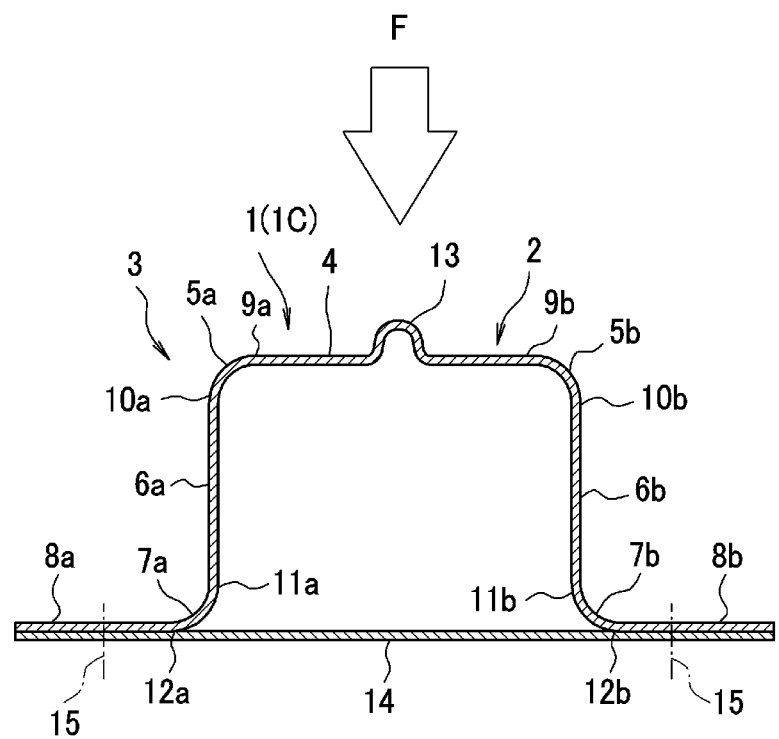
FIG. 16 shows a cross-sectional view showing a transverse cross-sectional shape of a door impact beam according to a second embodiment of the present invention.
Figure 20F:
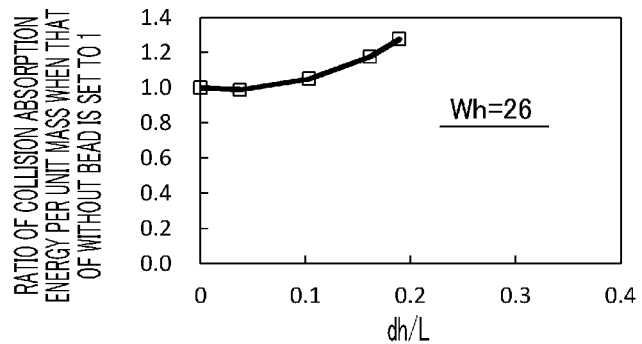
Figure 20G:
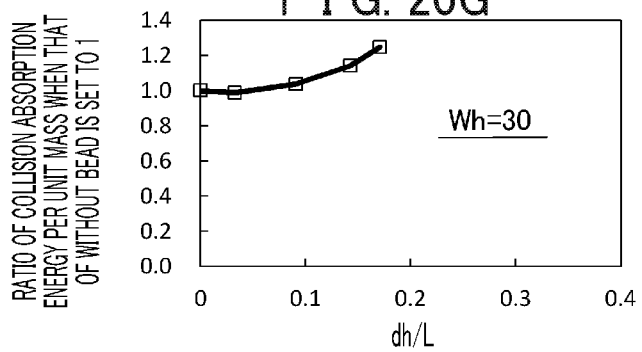
Figure 20H:
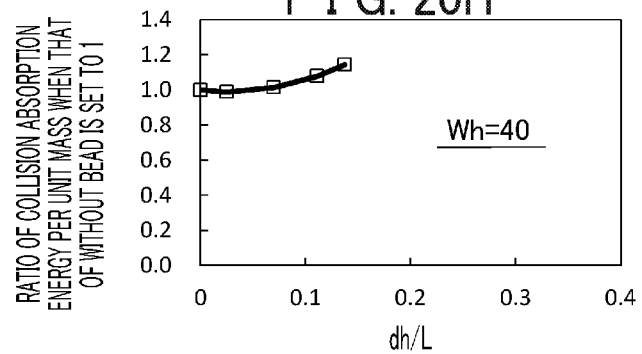
Figure 20I:
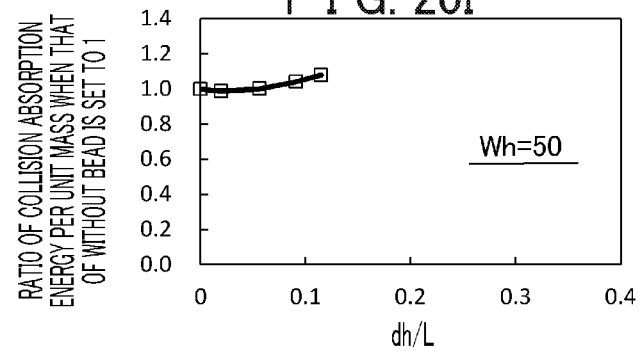

Next, the second embodiment of the door impact beam according to the present invention will be described. FIG. 16 shows a cross-sectional view showing a transverse cross-sectional shape of a door impact beam 1 according to the second embodiment of the present invention. Incidentally, a member or the like which is the same as or corresponds to that in the aforementioned first embodiment will be described by using the same reference numeral. In the second embodiment, in particular, the door impact beam 1 is joined to a back plate 14 on an opposite side of a groove bottom portion 4 in a bending deformation generation portion 3 of a main body 2, but a basic configuration of the second embodiment is similar to that of the first embodiment except that the back plate 14 is added as described above.

The basic configuration of the main body 2 itself is the same as that of the first embodiment, that is, the main body 2 has a long outer shape extending toward a direction orthogonal to a plane of FIG. 16. Further, a sheet thickness of a steel sheet constituting the main body 2 is about 1.4 to 2.3 mm, and a strength of this steel sheet is desirable to be 780 MPa or more for the sake of reduction in size and weight of the main body 2, is further desirable to be 980 MPa or more, and is most desirable to be 1180 MPa or more. The main body 2 has two door-attaching portions (not shown) in a longitudinal direction and the bending deformation generation portion 3.

The two door-attaching portions are respectively formed on both end portion sides of the longitudinal direction (direction orthogonal to the plane of FIG. 16) of the main body 2. The two door-attaching portions are portions for fixing the main body 2 to a predetermined attachment position in a door inner panel by an appropriate means (for example, fastening or the like by using a bolt and a nut), and are fixed to predetermined positions on a front end side and a rear end side in an automobile front and rear direction in the door inner panel.

The bending deformation generation portion 3 is disposed between these two door-attaching portions. In other words, FIG. 16 shows a transverse cross-sectional shape of the main body 2 in the bending deformation generation portion 3. Note that a transverse cross-sectional shape of the two door-attaching portions are not limited to a specific shape in particular as long as being a shape enabling secure attachment to the predetermined attachment position in the door inner panel.

The bending deformation generation portion 3 has the groove bottom portion 4, two edge line portions 5a, 5b, two vertical wall portions 6a, 6b, two curved portions 7a, 7b, and two flanges 8a, 8b.

The groove bottom portion 4 is formed in a plane state between R tangent ends 9a, 9b except a bead 13.

The two edge line portions 5a, 5b are formed in a curved surface state continuing to the groove bottom portion 4 via the R tangent ends 9a, 9b, respectively.

The two vertical wall portions 6a, 6b are formed in a plane state continuing to the two corresponding edge line portions 5a, 5b via R tangent ends 10a, 10b, respectively.

The two curved portions 7a, 7b are formed in a curved surface state continuing to the two corresponding vertical wall portions 6a, 6b via R tangent ends 11a, 11b, respectively.

Further, two flanges 8a, 8b are formed in a plane state continuing to the two corresponding curved portions 7a, 7b via R tangent ends 12a, 12b.

The back plate 14 is provided on back surfaces of the two flanges 8a, 8b on the opposite side of the groove bottom portion 4 in a manner to spread across the two flanges 8a, 8b by having the same width, and is joined and fixed to the bending deformation generation portion 3 by, for example, a joining method such as spot welding 15 or the like. As a result that in the second embodiment the back plate 14 is united to the bending deformation generation portion 3 in particular as described above, the bending deformation generation portion 3 has a closed cross-sectional shape.

Practically in the same manner as the first embodiment, the door impact beam 1 has the bead 13 formed toward the longitudinal direction of the main body 2 in a part of the groove bottom portion 4. The bead 13 is desirable to be formed in a central position between the R tangent ends 9a, 9b being both ends of the groove bottom portion 4, but is not limited to be formed in the central position, as long as being formed in an appropriate position between the R tangent ends 9a, 9b. Further, the bead 13 is desirable to be formed in almost an entire length of the longitudinal direction of the bending deformation generation portion 3. Note that the bead 13 is not limited to be formed in an entire length region in the longitudinal direction of the bending deformation generation portion 3, and, for example, the bead 13 is formed in a region of 5% or more of the entire length of the longitudinal direction of the bending deformation generation portion 3 in a vicinity of a central portion thereof. In other words, as a result that the bead 13 has a length of at least about 5% of the entire length of the bending deformation generation portion 3, a necessary and sufficient collision energy absorption performance can be achieved. Further, the bead 13 may be formed also in a door-attaching portion as long as attaching to the predetermined attachment position in the door inner panel is not hampered.

Here, a door impact beam 1C is cited as a comparative example to the second embodiment of the present invention. The door impact beam 1C is joined to a back plate 14 on an opposite side of a groove bottom portion 4 in a bending deformation generation portion 3 of a main body 2 as shown in FIG. 18A to FIG. 18G. However, a bead 13 is not formed in the groove bottom portion 4 in this comparative example. A basic configuration of the door impact beam 1C of the comparative example is similar to that of the door impact beam 1 according to the second embodiment except in that the bead 13 is not formed.

FIG. 17A to FIG. 17G show explanatory views showing analysis results of three-point bending in the door impact beam 1 according to the second embodiment of the present invention, and FIG. 17A to FIG. 17G show a perspective view and a cross-sectional view showing a situation of collapse of a cross-section in 0 mm, 24 mm, 45 mm, 60 mm, 78 mm, 99 mm, and 120 mm, respectively, in stroke ST of bending deformation of a three-point bending test thereof.

FIG. 18A to FIG. 18G show explanatory views showing analysis results of three-point bending in the door impact beam 1C according to the comparative example to the second embodiment of the present invention, and FIG. 18A to FIG. 18G show a perspective view and a cross-sectional view showing a situation of collapse of a cross-section in 0 mm, 24 mm, 45 mm, 60 mm, 78 mm, 99 mm, and 120 mm, respectively, in stroke ST of bending deformation of a three-point bending test thereof.

The door impact beam 1 of the present invention, as shown in FIG. 17A to FIG. 17G, is deformed in a manner that the bead 13 is crushed, that is, the bead 13 becomes smaller in height and larger in width as deformation due to bending progresses (ST: 0 mm→ST: 45 mm) in the door impact beam 1 having the main body 2 of the closed cross-sectional shape to which an impact load is applied, so that a peripheral length of the groove bottom portion 4 is increased. Thereby, the recess amount of the groove bottom portion 4, the amount of displacement toward the outside of the closed cross-section of the edge line portions 5a, 5b, and the fall amount toward the outside of the closed cross-section of the vertical wall portions 6a, 6b are suppressed than in the door impact beam 1C shown in FIG. 18A to FIG. 18G as the comparative example. Therefore, collapse of the cross-section in the door impact beam 1 can be delayed until ST: 78 mm or more, to thereby suppress load capacity reduction and fracture caused by collapse of the cross-sectional shape at the time of collision, so that collision energy can be absorbed efficiently.

On the other hand, as shown in FIG. 18A to FIG. 18G, in the door impact beam 1C of the comparative example, when an impact load is applied and deformation due to bending progresses (ST: 0 mm→ST: 45 mm), deformation progresses in an early stage in a manner that the groove bottom portion 4 is recessed, edge line portions 5a, 5b are displaced toward the outside of an closed cross-section, and curved portions 7a, 7b on an opposite side of the edge line portions 5a, 5b with vertical wall portions 6a, 6b therebetween are deformed toward inside in contrast. It is found that thereafter (ST: 45 mm→ST: 120 mm), because of collapse of the cross-sectional shape, loss in a collision load occurs and deformation is localized, bringing about higher risk of fracture.

As described above, in the present invention, as a result of having the bead 13 formed toward the longitudinal direction of the main body 2 in a part of the groove bottom portion 4, the bead 13 projecting in the shape having the curved surface toward the outside of the cross-sectional shape of the bending deformation generation portion 3 so as to oppose the impact load F acting on the door impact beam 1, the collision energy at the time of side collision can be absorbed efficiently.

Further, in the second embodiment of the present invention, the back plate 14 is further joined to the two flanges 8a, 8b and the flanges 8a, 8b are restrained by the back plate 14, whereby stiffness of the bending deformation generation portion 3 can be strengthened. Thereby, when the impact load F is acted on the door impact beam 1, deformation to broaden a range between the flanges 8a, 8b is suppressed and collapse of the cross-sectional shape of the bending deformation generation portion 3 is suppressed, so that the energy absorption performance can be improved.

Next, in the door impact beam 1 of the present invention, its operation and effect or the like will be analyzed further concretely.

In the second embodiment of the present invention, a cross-sectional peripheral length L of the groove bottom portion 4 changes depending on a web face width Wh and a bead height dh, and the door impact beam 1 of the cross-sectional peripheral length L of 10 mm≤L≤60 mm, which is practically used as a door impact beam of this kind, is used. Further, regarding a hat height H of the door impact beam 1, an application object of the present invention is a door impact beam with a hat height of 50 mm or less, which is regarded as a standard size as the door impact beam of this kind.

Here, Table 9 to Table 17 show analysis results of a relationship between a bead height dh and a collision absorption energy ratio per unit mass (hereinafter, simply referred to as energy ratio (unit mass)) with collision absorption energy of the door impact beam 1C of the comparative example in which the bead is not formed, that is, dh=0, being set to 1, when the cross-sectional peripheral length L of a web portion in the groove bottom portion 4 is altered practically in a range of 10 to 60 mm, the bead height dh being altered in four levels of 1, 3, 5, and 7 every web face width Wh in a case of 10, 12, 14, 18, 22, 26, 30, 40, and 50 mm in web face width Wh. Even in a case of the same web face width Wh, the cross-sectional peripheral lengths L of the web portions are different when the bead heights dh are different. Thus, the bead height dh is changed with the web face width Wh being the same, that is, the bead height dh is changed in four levels every representative web face width Wh, and the analysis is performed.

TABLE 9

| | | | | | | | | |
|---|---|---|---|---|---|---|---|---|
| | | | | Wh = 10 | | | | |
| No. | Bead Height dh [mm] | Web Face Width [mm] | Bead Peripheral Length [mm] | Cross-sectional Peripheral Length L [mm] | dh/L | Collision Absorption Energy [kJ] | Energy Ratio | Collision Absorption Energy (Unit Mass) [kJ/kg] | Energy Ratio (Unit Mass) |
| 201 | 0 | 10 | 0.00 | 10.00 | 0.00 | 1.229 | 1.00 | 0.458 | 1.00 |
| 202 | 1 | 10 | 6.20 | 10.45 | 0.10 | 1.232 | 1.00 | 0.463 | 1.01 |
| 203 | 3 | 10 | 9.99 | 12.99 | 0.23 | 1.304 | 1.06 | 0.494 | 1.08 |

TABLE 9-continued

Wh = 10

| No, | Bead Height dh [mm] | Web Face Width [mm] | Bead Peripheral Length [mm] | Cross-sectional Peripheral Length L [mm] | dh/L | Collision Absorption Energy [kJ] | Energy Ratio | Collision Absorption Energy (Unit Mass) [kJ/kg] | Energy Ratio (Unit Mass) |
|---|---|---|---|---|---|---|---|---|---|
| 204 | 5 | 10 | 14.00 | 17.00 | 0.29 | 1.382 | 1.12 | 0.524 | 1.14 |
| 205 | 7 | 10 | 17.99 | 21.00 | 0.33 | 1.520 | 1.24 | 0.576 | 1.26 |

TABLE 10

Wh = 12

| No, | Bead Height dh [mm] | Web Face Width [mm] | Bead Peripheral Length [mm] | Cross-sectional Peripheral Length L [mm] | dh/L | Collision Absorption Energy [kJ] | Energy Ratio | Collision Absorption Energy (Unit Mass) [kJ/kg] | Energy Ratio (Unit Mass) |
|---|---|---|---|---|---|---|---|---|---|
| 206 | 0 | 12 | 0.00 | 12.00 | 0.00 | 1.215 | 1.00 | 0.444 | 1.00 |
| 207 | 1 | 12 | 6.20 | 12.45 | 0.08 | 1.202 | 0.99 | 0.443 | 1.00 |
| 208 | 3 | 12 | 9.99 | 15.07 | 0.20 | 1.419 | 1.17 | 0.527 | 1.19 |
| 209 | 5 | 12 | 14.00 | 19.00 | 0.26 | 1.367 | 1.13 | 0.508 | 1.14 |
| 210 | 7 | 12 | 17.99 | 23.00 | 0.30 | 1.504 | 1.24 | 0.558 | 1.26 |

TABLE 11

Wh = 14

| No, | Bead Height dh [mm] | Web Face Width [mm] | Bead Peripheral Length [mm] | Cross-sectional Peripheral Length L [mm] | dh/L | Collision Absorption Energy [kJ] | Energy Ratio | Collision Absorption Energy (Unit Mass) [kJ/kg] | Energy Ratio (Unit Mass) |
|---|---|---|---|---|---|---|---|---|---|
| 211 | 0 | 14 | 0.00 | 14.00 | 0.00 | 1.213 | 1.00 | 0.435 | 1.00 |
| 212 | 1 | 14 | 6.20 | 14.45 | 0.07 | 1.201 | 0.99 | 0.434 | 1.00 |
| 213 | 3 | 14 | 9.99 | 17.07 | 0.18 | 1.426 | 1.18 | 0.519 | 1.19 |
| 214 | 5 | 14 | 14.00 | 21.00 | 0.24 | 1.367 | 1.13 | 0.497 | 1.14 |
| 215 | 7 | 14 | 17.99 | 25.00 | 0.28 | 1.502 | 1.24 | 0.547 | 1.26 |

TABLE 12

Wh = 18

| No, | Bead Height dh [mm] | Web Face Width [mm] | Bead Peripheral Length [mm] | Cross-sectional Peripheral Length L [mm] | dh/L | Collision Absorption Energy [kJ] | Energy Ratio | Collision Absorption Energy (Unit Mass) [kJ/kg] | Energy Ratio (Unit Mass) |
|---|---|---|---|---|---|---|---|---|---|
| 216 | 0 | 18 | 0.00 | 18.00 | 0.00 | 1.223 | 1.00 | 0.422 | 1.00 |
| 217 | 1 | 18 | 6.20 | 18.45 | 0.05 | 1.207 | 0.99 | 0.419 | 0.99 |
| 218 | 3 | 18 | 9.99 | 21.00 | 0.14 | 1.328 | 1.09 | 0.464 | 1.10 |
| 219 | 5 | 18 | 14.00 | 23.00 | 0.22 | 1.394 | 1.14 | 0.488 | 1.16 |
| 220 | 7 | 18 | 17.99 | 28.99 | 0.24 | 1.519 | 1.24 | 0.532 | 1.26 |

TABLE 13

| | | | | Wh = 22 | | | | |
|---|---|---|---|---|---|---|---|---|
| No, | Bead Height dh [mm] | Web Face Width [mm] | Bead Peripheral Length [mm] | Cross-sectional Peripheral Length L [mm] | dh/L | Collision Absorption Energy [kJ] | Energy Ratio | Collision Absorption Energy (Unit Mass) [kJ/kg] | Energy Ratio (Unit Mass) |
| 221 | 0 | 22 | 0.00 | 22.00 | 0.00 | 1.241 | 1.00 | 0.412 | 1.00 |
| 222 | 1 | 22 | 6.20 | 22.45 | 0.04 | 1.221 | 0.98 | 0.409 | 0.99 |
| 223 | 3 | 22 | 9.99 | 25.00 | 0.12 | 1.312 | 1.06 | 0.442 | 1.07 |
| 224 | 5 | 22 | 14.00 | 27.00 | 0.19 | 1.445 | 1.16 | 0.487 | 1.18 |
| 225 | 7 | 22 | 17.99 | 33.00 | 0.21 | 1.552 | 1.25 | 0.523 | 1.27 |

TABLE 14

| | | | | Wh = 26 | | | | |
|---|---|---|---|---|---|---|---|---|
| No, | Bead Height dh [mm] | Web Face Width [mm] | Bead Peripheral Length [mm] | Cross-sectional Peripheral Length L [mm] | dh/L | Collision Absorption Energy [kJ] | Energy Ratio | Collision Absorption Energy (Unit Mass) [kJ/kg] | Energy Ratio (Unit Mass) |
| 226 | 0 | 26 | 0.00 | 26.00 | 0.00 | 1.262 | 1.00 | 0.404 | 1.00 |
| 227 | 1 | 26 | 6.20 | 26.45 | 0.04 | 1.239 | 0.98 | 0.400 | 0.99 |
| 228 | 3 | 26 | 9.99 | 29.00 | 0.10 | 1.308 | 1.04 | 0.425 | 1.05 |
| 229 | 5 | 26 | 14.00 | 31.00 | 0.16 | 1.465 | 1.16 | 0.476 | 1.18 |
| 230 | 7 | 26 | 17.99 | 37.00 | 0.19 | 1.589 | 1.26 | 0.516 | 1.28 |

TABLE 15

| | | | | Wh = 30 | | | | |
|---|---|---|---|---|---|---|---|---|
| No, | Bead Height dh [mm] | Web Face Width [mm] | Bead Peripheral Length [mm] | Cross-sectional Peripheral Length L [mm] | dh/L | Collision Absorption Energy [kJ] | Energy Ratio | Collision Absorption Energy (Unit Mass) [kJ/kg] | Energy Ratio (Unit Mass) |
| 231 | 0 | 30 | 0.00 | 30.00 | 0.00 | 1.279 | 1.00 | 0.396 | 1.00 |
| 232 | 1 | 30 | 6.20 | 30.45 | 0.03 | 1.256 | 0.98 | 0.392 | 0.99 |
| 233 | 3 | 30 | 9.99 | 33.00 | 0.09 | 1.310 | 1.02 | 0.411 | 1.04 |
| 234 | 5 | 30 | 14.00 | 35.00 | 0.14 | 1.441 | 1.13 | 0.452 | 1.14 |
| 235 | 7 | 30 | 17.99 | 41.00 | 0.17 | 1.576 | 1.23 | 0.495 | 1.25 |

TABLE 16

| | | | | Wh = 40 | | | | |
|---|---|---|---|---|---|---|---|---|
| No, | Bead Height dh [mm] | Web Face Width [mm] | Bead Peripheral Length [mm] | Cross-sectional Peripheral Length L [mm] | dh/L | Collision Absorption Energy [kJ] | Energy Ratio | Collision Absorption Energy (Unit Mass) [kJ/kg] | Energy Ratio (Unit Mass) |
| 236 | 0 | 40 | 0.00 | 40.00 | 0.00 | 1.318 | 1.00 | 0.376 | 1.00 |
| 237 | 1 | 40 | 6.20 | 40.45 | 0.02 | 1.295 | 0.98 | 0.372 | 0.99 |
| 238 | 3 | 40 | 9.99 | 43.00 | 0.07 | 1.321 | 1.00 | 0.381 | 1.01 |
| 239 | 5 | 40 | 14.00 | 45.00 | 0.11 | 1.404 | 1.07 | 0.406 | 1.08 |
| 240 | 7 | 40 | 17.99 | 51.00 | 0.14 | 1.488 | 1.13 | 0.430 | 1.14 |

TABLE 17

Wh = 50

| No, | Bead Height dh [mm] | Web Face Width [mm] | Bead Peripheral Length [mm] | Cross-sectional Peripheral Length L [mm] | dh/L | Collision Absorption Energy [kJ] | Energy Ratio | Collision Absorption Energy (Unit Mass) [kJ/kg] | Energy Ratio (Unit Mass) |
|---|---|---|---|---|---|---|---|---|---|
| 241 | 0 | 50 | 0.00 | 50.00 | 0.00 | 1.353 | 1.00 | 0.358 | 1.00 |
| 242 | 1 | 50 | 6.20 | 50.45 | 0.02 | 1.328 | 0.98 | 0.353 | 0.99 |
| 243 | 3 | 50 | 9.99 | 53.00 | 0.06 | 1.340 | 0.99 | 0.358 | 1.00 |
| 244 | 5 | 50 | 14.00 | 55.00 | 0.09 | 1.392 | 1.03 | 0.373 | 1.04 |
| 245 | 7 | 50 | 17.99 | 61.00 | 0.11 | 1.443 | 1.07 | 0.386 | 1.08 |

FIG. 19A to FIG. 19I show graphs each showing a relationship between the bead height dh and the energy ratio (unit mass) in a case of web face width Wh=10, 12, 14, 18, 22, 26, 30, 40, and 50 mm, based on the analysis results of Table 9 to Table 17. Further, FIG. 20A to FIG. 20I show graphs each showing a relationship between a ratio (dh/L) of the bead height dh to the cross-sectional peripheral length L and the energy ratio (unit mass) with energy of the door impact beam 1C of the comparative example in which the bead is not formed being set to 1, in a case where web face width Wh=10, 12, 14, 18, 22, 26, 30, 40, and 50 mm, based on the analysis results of Table 9 to Table 17.

Figure 21:
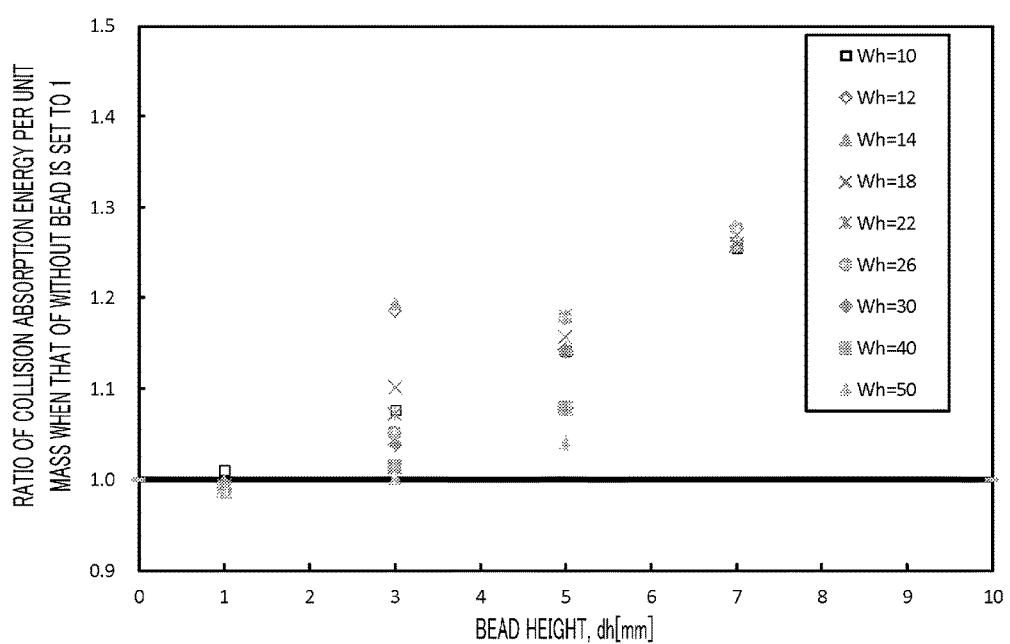
FIG. 21 shows a graph showing relationships between bead heights and collision absorption energy ratios with the collision energy of the door impact beam of the comparative example in which the bead is not formed being set to 1, when the bead height is altered in four levels of 1, 3, 5, and 7 mm in a case of 10, 12, 14, 18, 22, 26, 30, 40, and 50 mm, respectively, in web face width.

FIG. 21 shows a graph showing relationships between bead heights dh and energy ratios (unit mass) with energy of the door impact beam 1C of the comparative example in which the bead is not formed being set to 1, when the aforementioned analysis is performed, the bead height dh being altered in four levels of 1, 3, 5, and 7 mm in a case of 10, 12, 14, 18, 22, 26, 30, 40, and 50 mm in web face width Wh.

With reference also to Table 9 to Table 17, all the energy ratios (unit mass) become less than 1.0 in a range of web face width Wh=10 to 50 mm in a case of the bead height dh=1. Thus, the bead height dh is desirable to be in a range of at least 1 mm<dh, and 1 mm<dh≤7 in particular.

This is considered to be because, though the bead height affects the energy ratio (unit mass), the bead height as small as dh=1 mm does not effectively act on stress dispersion against the impact load.

Figure 22:
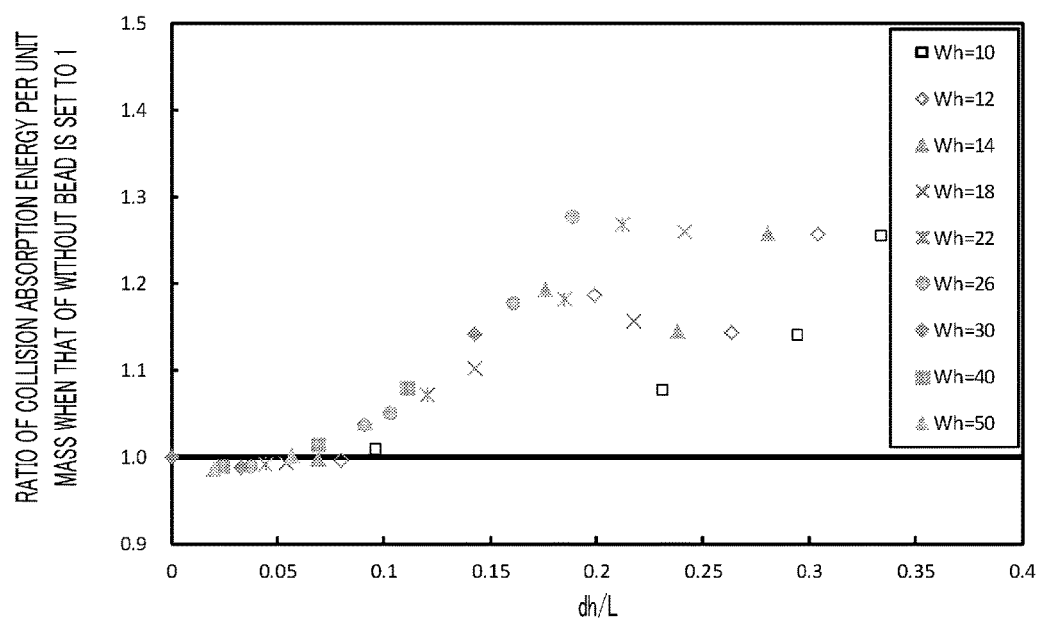
FIG. 22 shows a graph showing relationships between ratios of bead heights to cross-sectional peripheral lengths and collision absorption energy ratios with the collision absorption energy of the door impact beam of the comparative example in which the bead is not formed being set to 1, in a case of 10, 12, 14, 18, 22, 26, 30, 40, and 50 mm, respectively, in web face width.

Further, FIG. 22 shows a graph showing relationships between ratios (dh/L) of bead heights dh to cross-sectional peripheral lengths L and energy ratios (unit mass) with energy of the door impact beam 1C of the comparative example in which the bead is not formed being set to 1, in a case of 10, 12, 14, 18, 22, 26, 30, 40, and 50 mm in web face width Wh.

With reference also to Table 9 to Table 17, dh/L<0.1 brings about the energy ratio (unit mass) of less than 1.0, and 0.1≤dh/L brings about the energy ratio (unit mass) of 1.0 or more. Therefore, the ratio of the bead height dh to the cross-sectional peripheral length L is desirable to be in a range of 0.1≤dh/L.

As described above, the ratio dh/L of the bead height dh to the cross-sectional peripheral length L affects the energy ratio (unit mass), and this is considered to be because, as described above, the larger the cross-sectional peripheral length L is, the more collapse of the cross-section of the impact beam is affected, and the smaller the bead height dh is, the more stress dispersion is affected.

From Table 9 to Table 17 and graphs of FIGS. 19A~19I to FIG. 22, in the door impact beam 1 of 10 mm≤L≤60 mm, the energy ratio (unit mass) tends to become smaller as the cross-sectional peripheral length becomes larger similarly to in the first embodiment, and when the cross-sectional peripheral length L exceeds 50 mm, some samples such as the sample No. 243 in Table 17 have the energy ratio (unit mass) of 1 even with dh=3 mm. Therefore, an effective range of the cross-sectional peripheral length is set to 10 mm≤L≤50 mm. Further, regarding the height dh of the bead 13 from the plane of the groove bottom portion 4 of the bead 13 and the ratio dh/L of the bead height dh to the cross-sectional peripheral length L, a range of at least 1 mm<dh, and 1 mm<dh≤7 in particular are desirable. Further, a range of 0.1≤dh/L is desirable. Then, an excellent energy absorption performance can be obtained in these ranges.

The door impact beam 1 of the second embodiment, in particular, of the present invention has the closed cross-sectional shape by the back plate 14 being united to the bending deformation generation portion 3. Providing the back plate 14 suppresses deformation of the vertical wall portions 6a, 6b toward the outside by synergy with the bead 13, alleviating distortion concentration in the edge line portions 5a, 5b on a side closer to the web face, so that the risk of fracture can be reduced. Strengthening the stiffness of the bending deformation generation portion 3 by the back plate 14 secures all the energy ratios (unit mass) to be 1.0 or more as shown in Table 9 to Table 17 even with the bead height dh=7, for example, bringing about a high energy absorption performance. Further, necessary stiffness can be secured even if the cross-sectional peripheral length L of the groove bottom portion 4 is made longer, so that the application range of the present invention can be enlarged effectively.

Note that the embodiments described hereinabove are merely concrete examples to implement the present invention, and it is to be understood that the technical scope of the present invention will not be construed restrictive by these embodiments. In other words, the present invention can be realized in various forms without departing from the technical spirit and the main features thereof.

INDUSTRIAL APPLICABILITY

According to the present invention, it is possible to provide a door impact beam constituted by a molded body made by a thin steel sheet having a predetermined cross-sectional shape and capable of absorbing collision energy efficiently by suppressing load loss and fracture caused by collapse of the cross-sectional shape at the time of collision.

REFERENCE SIGNS LIST 1 door impact beam
2 main body 3 bending deformation generation portion
4 groove bottom portion
5a, 5b edge line portions
6a, 6b vertical wall portions
7a, 7b curved portions
8a, 8b flanges
13 bead
14 back plate

The invention claimed is:

1. A door impact beam constituted to include a long main body being a molded body of a metal plate, and disposed in a predetermined position between a door outer panel and a door inner panel, the main body consisting of: door attaching portions respectively formed on both ends of a long longitudinal direction thereof; and a bending deformation generation portion disposed between the door attaching portions,
wherein the bending deformation generation portion has: a groove bottom portion; two edge line portions formed in a curved state continuing to the groove bottom portion respectively; two vertical wall portions continuing to the two edge line portions respectively; two curved portions continuing to the two vertical wall portions respectively; two flanges continuing to the two curved portions respectively; and
a bead which is formed along the longitudinal direction of the main body in a part of the groove bottom portion in a manner to project in a shape having a curved surface positioned at the top-most portion of the bead toward the outside of a cross-sectional shape of the bending deformation generation portion to oppose an impact load acting on the door impact beam, and
wherein the door attaching portions are configured to fix both end portions of the door impact beam to the door inner panel without binding the bending deformation generation portion,
wherein the bending deformation generation portion has a hat-shaped open cross-sectional shape whose hat height is 50 mm or less and a cross-sectional peripheral length of the groove bottom portion is 10 mm≤L≤35 mm, and
wherein the bead satisfies relationships in a first and second formula below,
the first formula being 1 mm<dh≤7 mm,
the second formula being 0.1≤dh/L,
where, a reference symbol L in the first and second formula indicates a cross-sectional peripheral length of a groove bottom portion and a reference symbol dh indicates a height of the bead from a plane of the groove bottom portion.

2. The door impact beam according to claim 1,
wherein the bead is formed in a region of at least 5% or more of an entire length of the longitudinal direction of the bending deformation generation portion in a vicinity of a central portion thereof.

3. A door impact beam constituted to include a long main body being a molded body of a metal plate, and disposed in a predetermined position between a door outer panel and a door inner panel, the main body consisting of: door attaching portions respectively formed on both ends of a long longitudinal direction thereof; and a bending deformation generation portion disposed between the door attaching portions,
wherein the bending deformation generation portion has: a groove bottom portion; two edge line portions formed in a curved state continuing to the groove bottom portion respectively; two vertical wall portions continuing to the two edge line portions respectively; two curved portions continuing to the two vertical wall portions respectively; two flanges continuing to the two curved portions respectively; and
a bead which is formed along the longitudinal direction of the main body in a part of the groove bottom portion in a manner to project in a shape having a curved surface positioned at the top-most portion of the bead toward the outside of a cross-sectional shape of the bending deformation generation portion to oppose an impact load acting on the door impact beam,
wherein the door attaching portions are configured to fix both end portions of the door impact beam to the door inner panel without binding the bending deformation generation portion,
wherein the door impact beam is configured to include the main body and a back plate,
wherein the bending deformation generation portion has a closed cross-sectional shape made by joining the back plate to the two flanges in a hat-shaped cross-section whose hat height is 50 mm or less and a cross-sectional peripheral length of the groove bottom portion is 10 mm≤L≤50 mm, and
wherein the bead satisfies relationships in a first and second formula below,
the first formula being 1 mm<dh≤7 mm,
the second formula being 0.1≤dh/L,
where, a reference symbol L in the first and second formula indicates a cross-sectional peripheral length of the groove bottom portion and a reference symbol dh indicates a height of the bead from a plane of the groove bottom portion.

4. The door impact beam according to claim 3,
wherein the bead is formed in a region of at least 5% or more of an entire length of the longitudinal direction of the bending deformation generation portion in a vicinity of a central portion thereof.

* * * * *